(12) United States Patent
Barve et al.

(10) Patent No.: US 12,399,932 B1
(45) Date of Patent: *Aug. 26, 2025

(54) APPARATUS AND METHODS FOR VISUALIZATION WITHIN A THREE-DIMENSIONAL MODEL USING NEURAL NETWORKS

(71) Applicant: Anumana, Inc., Cambridge, MA (US)

(72) Inventors: Rakesh Barve, Bengaluru (IN);
Uddeshya Upadhyay, Bengaluru (IN);
Abhijith Chunduru, Bengaluru (IN);
Suthirth Vaidya, Bengaluru (IN);
Arjun Puranik, San Jose, CA (US);
Sai Saketh Chennamsetty, Bengaluru (IN)

(73) Assignee: Anumana, Inc., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/953,949

(22) Filed: Nov. 20, 2024

Related U.S. Application Data

(63) Continuation-in-part of application No. 18/648,176, filed on Apr. 26, 2024, now Pat. No. 12,154,245.

(51) Int. Cl.
*G06F 16/53* (2019.01)
*G06F 16/532* (2019.01)
(Continued)

(52) U.S. Cl.
CPC .......... *G06F 16/532* (2019.01); *G06F 16/538* (2019.01)

(58) Field of Classification Search
CPC ......... G06T 11/60; G06T 19/20; G06T 17/00; G06T 2210/41; G06T 2219/2004; G06T 15/10; G06T 15/50; G06T 7/73; G06F 16/54; G06F 16/535; G06F 18/22–23; G06F 30/27; G06F 18/214; G06F 18/2413; G06F 18/2193; G06F 18/21347; G06N 3/084; G06N 3/088; G06N 3/045; G06N 3/04; G06N 3/063; G06N 3/047; G06N 3/042; G06N 3/0455; G06N 5/04;
(Continued)

(56) References Cited

U.S. PATENT DOCUMENTS

| 6,926,714 B1 | 8/2005 | Sra |
| 10,398,337 B2 | 9/2019 | Zigelman et al. |

(Continued)

*Primary Examiner* — Wesner Sajous
(74) *Attorney, Agent, or Firm* — Caldwell Intellectual Property Law

(57) ABSTRACT

Apparatus for visualization within a three-dimensional (3D) model and methods used therein are described, wherein the apparatus includes a processor and a memory communicatively connected to the processor, wherein the memory includes instructions configuring the processor to receive a query image, extract neural network encodings from the received query image, query a synthetic image repository for at least a matching synthetic image, and display an estimated position and orientation within the 3D model, wherein the synthetic image repository includes a plurality of synthetic images and their extracted neural network encodings, each synthetic image therein corresponds to a slice extracted at a specific position and orientation in the 3D model, and querying the synthetic image repository includes comparing the extracted neural network encodings between the query image and synthetic images.

20 Claims, 10 Drawing Sheets

(51) Int. Cl.
  *G06F 16/538*   (2019.01)
  *G06F 18/22*    (2023.01)
  *G06F 30/27*    (2020.01)
  *G06N 3/04*     (2023.01)
  *G06N 3/08*     (2023.01)
  *G06T 11/60*    (2006.01)
  *G06T 15/20*    (2011.01)
  *G06T 17/00*    (2006.01)
  *G06T 19/20*    (2011.01)
  *G06V 10/77*    (2022.01)
  *G06V 10/82*    (2022.01)

(58) Field of Classification Search
  CPC .. G06N 5/01–02; G06V 10/764; G06V 10/82; G06V 10/761; G06V 10/774; G06V 10/76; G06V 10/751; G06V 10/70–75
  See application file for complete search history.

(56) References Cited

U.S. PATENT DOCUMENTS

| | | | |
|---|---|---|---|
| 10,769,411 B2 * | 9/2020 | Grabner | G06T 19/20 |
| 11,205,096 B2 | 12/2021 | Zhang | |
| 11,534,136 B2 | 12/2022 | Funka-Lea et al. | |
| 2021/0397198 A1 | 12/2021 | Bozchalooi et al. | |
| 2022/0012881 A1 * | 1/2022 | Han | G06T 7/0012 |
| 2022/0067441 A1 | 3/2022 | Zhang et al. | |
| 2022/0230310 A1 * | 7/2022 | Xie | G06T 7/62 |
| 2022/0237833 A1 | 7/2022 | Kim et al. | |
| 2022/0237838 A1 * | 7/2022 | Liu | G06N 3/063 |
| 2022/0391667 A1 | 12/2022 | Law | |
| 2022/0405448 A1 | 12/2022 | Mezghanni et al. | |
| 2023/0134690 A1 | 5/2023 | Chen et al. | |
| 2023/0153988 A1 * | 5/2023 | Admasu | G06N 3/0475 433/24 |

* cited by examiner

APPARATUS AND METHODS FOR VISUALIZATION WITHIN A THREE-DIMENSIONAL MODEL USING NEURAL NETWORKS

CROSS-REFERENCE TO RELATED APPLICATIONS

This application is a continuation-in-part of Non-provisional application Ser. No. 18/648,176 filed on Apr. 26, 2024, now U.S. Pat. No. 12,154,245, Issued on Nov. 26, 2024, and entitled "APPARATUS AND METHODS FOR VISUALIZATION WITHIN A THREE-DIMENSIONAL MODEL USING NEURAL NETWORKS," the entirety of which is incorporated herein by reference.

FIELD OF THE INVENTION

The present invention generally relates to the field of image generation and recognition. In particular, the present invention is directed to apparatus and methods for visualization within a three-dimensional model using neural networks.

BACKGROUND

Atrial fibrillation ablation procedures require navigation of an ablation catheter to the pulmonary veins in order to electrically isolate them from the left atrium. The positioning of the catheter, as well as the anatomy of the pulmonary veins and left atrium, is commonly confirmed by three-dimensional (3D) electro-anatomical mapping, intracardiac echocardiography (ICE), or a combination thereof. When ICE is used, it is challenging to understand the orientation and position of the catheter relative to the 3D anatomy of the heart. As a result, atrial fibrillation ablation procedures typically require lots of experience.

SUMMARY OF THE DISCLOSURE

In an aspect, an apparatus that provides visualization within a three-dimensional (3D) model is described. Apparatus includes at least a processor and a memory communicatively connected to the at least a processor, configuring the at least a processor to receive a query image, extract neural network encodings as a function of the received query image, query a synthetic image repository for at least a matching synthetic image based on the extracted neural network encodings, and display an estimated position and orientation within the 3D model. Wherein querying the synthetic image repository for at least a matching synthetic image based on the extracted neural network encodings includes each synthetic image within the plurality of synthetic images corresponding to a specific position and orientation in a 3D model and querying the synthetic image repository compares the extracted neural network encodings of the query image with the extracted neural network encodings of each synthetic image within the plurality of synthetic images.

In another aspect, a method for providing visualization within a 3D model is described. Method is performed by at least a processor and includes receiving a query image, extracting neural network encodings from the received query image, querying a synthetic image repository for at least a matching synthetic image based on the extracted neural network encodings, and displaying an estimated position and orientation within the 3D model.

These and other aspects and features of nonlimiting embodiments of the present invention will become apparent to those skilled in the art upon review of the following description of specific nonlimiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for visualization within a three-dimensional (3D) model using a query image and neural networks. In one or more embodiments, at least a processor may be configured to populate a synthetic image repository by generating a plurality of synthetic images from 3D model and position query image in the 3D model by querying the synthetic image repository, wherein neural network encodings may be extracted from both the query image and the plurality of synthetic images.

Aspect of the present disclosure may be used to aid medical professionals in medical procedures by providing more precise visual guides. Aspects of the present disclosure may allow for greater versatility in research and development related to cardiac diagnostics. Exemplary embodiments illustrating aspects of the present disclosure are described below in the context of several specific examples.

Figure 1:
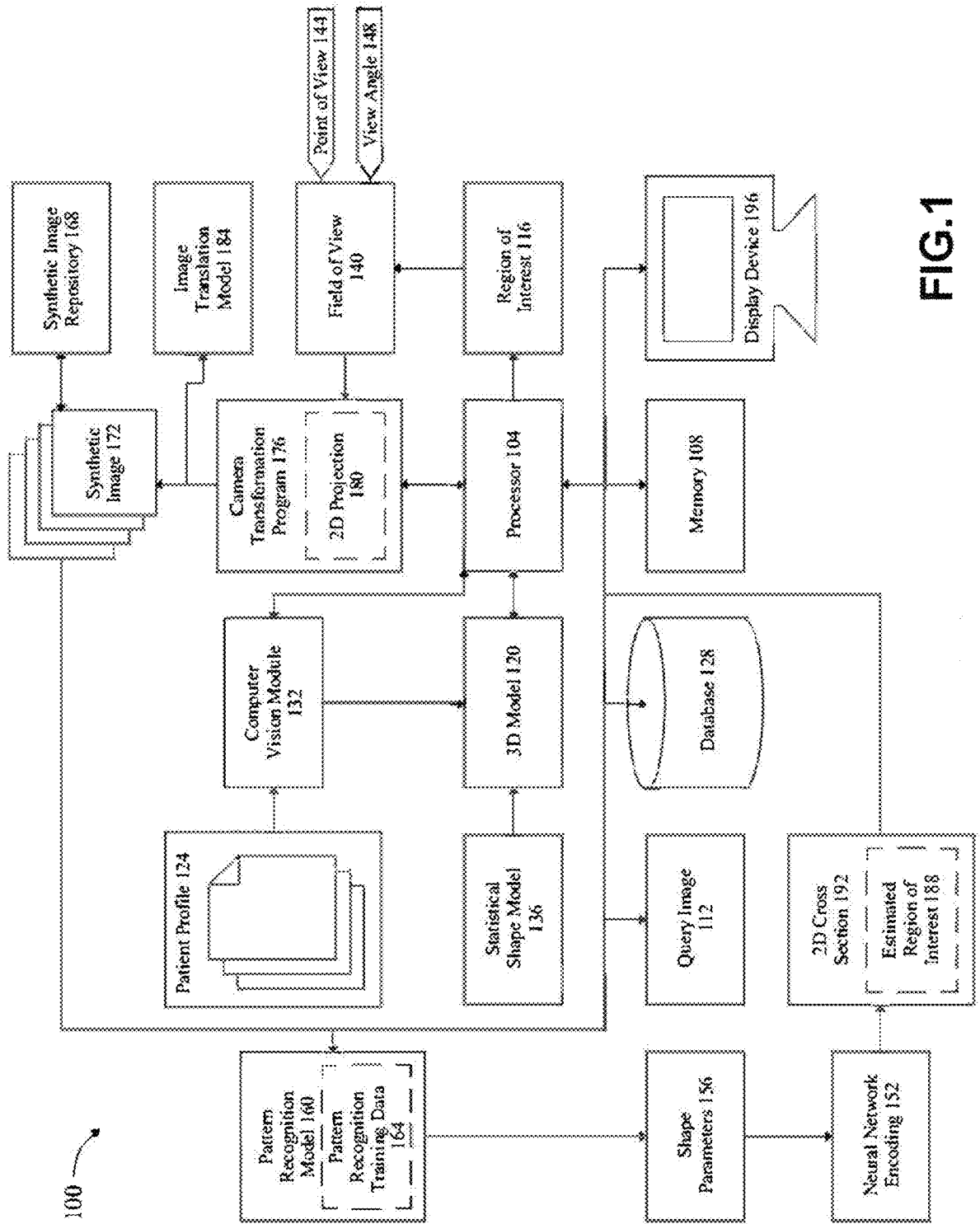
FIG. 1 is an exemplary embodiment of an apparatus that provides visualization within a three-dimensional (3D) model using neural networks.

Referring now to FIG. 1, an exemplary embodiment of an apparatus 100 for visualization within a 3D model using neural networks is illustrated. Apparatus 100 includes at least a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a laptop computer or a smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a first computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. In one or more embodiments, processor 104 may be implemented using a "shared nothing" architecture in which data is cached at the worker; this may enable scalability of apparatus 100 and/or computing device.

With continued reference to FIG. 1, in one or more embodiments, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. A person of ordinary skill in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108 communicatively connected to at least a processor 104, wherein the memory 108 contains instructions configuring the at least a processor 104 to perform any processing steps described herein. For the purposes of this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may perform determinations, classification, and/or analysis steps, methods, processes, or the like as described in this disclosure using machine learning processes. For the purposes of this disclosure, a "machine learning process" is a process that automatedly uses a body of data known as "training data" and/or a "training set" (which is described further below in this disclosure) to generate an algorithm that will be performed by a processor 104/module to produce outputs given data provided as inputs; this is in contrast to a non-machine learning software program where the commands to be executed are determined in advance by a user and written in a programming language. Machine learning process may utilize supervised, unsupervised, lazy-learning processes and/or neural networks, as described further below.

With continued reference to FIG. 1, processor 104 is configured to receive a query image 112. For the purposes of disclosure, a "query image" is an image used as a query to match another image and/or to selectively retrieve information for use in further method steps as disclosed below; each query image has an associated region of interest (ROI) 116 that is to be determined or estimated in 3D space, as described below. Query image 112 may include a medical image. For the purposes of this disclosure, a "medical image" is a two-dimensional visual representation containing information pertaining to an interior of a body and functions of organs/tissues therein that may aid clinical analysis and medical intervention. Query image 112 may include, without limitation, X-ray image, echocardiogram (ECG), magnetic resonance imaging (MRI) scan, computed tomography (CT) scan 120, and/or ultrasonic image. As used herein, an "ultrasonic image" is an image generated as a function of a reflection of a sound wave off of a structure. Non-limiting examples of ultrasonic images and/or imaging techniques include intracardiac echo (ICE) images, transthoracic echocardiograms (TTE), transesophageal echocardiograms (TEE), and point of care ultrasound (POCUS). In some embodiments, a set of ultrasonic images of the patient's organ may include an image selected from the list consisting of a transesophageal echocardiogram image, a transthoracic echocardiogram image, and a point-of-care ultrasound image. As used herein, a "structure" is a component of a subject. Non-limiting examples of structures include organs and tissues. In some embodiments, a structure includes an organ of a subject. In non-limiting examples, a structure may include a heart, lung, spleen, liver, kidney, muscle, skeleton, intestine, stomach, vein, and/or artery. In additional non-limiting examples, a structure may include a left atrium, left atrial appendage, left ventricle, right ventricle, and/or a right atrium. For the purposes of this disclosure, computed tomography (CT) is a medical imaging technique that uses X-rays to capture cross-sectional images (slices) of a patient's body; by taking a plurality of slices, a CT scan creates a detailed three-dimensional (3D) representation of internal structures. For the purposes of this disclosure, an "ICE image" or "ICE frame" is a 2D ultrasound image that represents anatomy (i.e., walls, chambers, blood vessels, etc.) of at least part of a heart, as described above. For the purposes of this disclosure, a "transthoracic echocardiogram (TTE) image" or "TTE frame" is a two-dimensional (2D) ultrasound image collected by placing a probe or ultrasound transducer on patient's chest or abdomen to collect various views of heart. For the purposes of this disclosure, a "transesophageal echocardiogram (TEE) image" or "TEE frame" is a 2D ultrasound image collected by passing a specialized probe containing an ultrasound transducer at its tip into patient's esophagus; it is an alternative way of performing echocardiography. For the purposes of this disclosure, "echocardiography" is an imaging technique that uses ultrasound to examine the heart, the resulting visual image of which is an echocardiogram. Structures may include, without limitation, chambers (e.g., four chambers including left and right atria and left and right ventricles), valves (i.e., the structures that regulate blood flow between chambers and vessels, including mitral, tricuspid, aortic, and pulmonary valves), vessels (e.g., aorta, pulmonary arteries and veins, and coronary arteries), conduction system (i.e., a network of specialized cells that controls the heart's electrical activity and rhythm), muscular and connective tissues (e.g., heart's muscular walls, septa, any other connective tissues that provide structural integrity and enable contraction), left atrial appendage and other appendages, pathological features (e.g., any abnormalities, defects, and/or the like), and/or other components of the heart. Ultrasonic images may be either collected and recorded by a medical professional using an image capture device. For example, and without limitation, such as an ICE catheter, or synthesized from a 3D model 120 using a synthetic ICE generator, as described below. In one or more embodiments, query image 112 may be saved to and/or retrieved later from a patient profile 124 and/or a database 128.

With continued reference to FIG. 1, for the purposes of this disclosure, a "model" or "3D model" refers to a digital representation of a three-dimensional object, capturing its internal structures and geometry. In one or more embodiments, 3D model 120 may be a digital representation (i.e., a 3D heart model) of a patient's heart, capturing its anatomy, geometry, and potentially functional properties. The apparatus and methods described in this disclosure may be agnostic to how 3D model 120 is generated. As nonlimiting examples, 3D heart model may be generated from electroanatomical mapping, pre-operative computed tomography (CT), MRI scans, or synthetically reconstructed using echocardiography frames such as, without limitation, ICE frames and transthoracic echocardiogram (TTE) frames. For the purposes of this disclosure, a patient is a human or any individual organism, on whom or on which a procedure, study, or otherwise experiment, such as without limitation, atrial fibrillation ablation, may be conducted. In a nonlimiting example, processor 104 may receive model 120 from a human patient with atrial fibrillation who is undergoing a procedure, an individual undergoing cardiac screening, a participant in a clinical trial, an individual with congenital heart disease, a heart transplant candidate, an individual receiving follow-up care after cardiac surgery, a healthy volunteer, an individual with heart failure, and/or the like. Additionally or alternatively, patient may include an animal model (i.e., an animal used to model atrial fibrillation such as a laboratory rat).

With continued reference to FIG. 1, in one or more embodiments, at least a processor 104 may be configured to construct 3D model 120 based on patient profile 124. For the purposes of this disclosure, a "patient profile" is a comprehensive collection of information related to an individual patient. In one or more embodiments, patient profile 124 may include a variety of data, including metadata as described below, that, when combined, provides a detailed picture of the patient's overall health. In one or more embodiments, patient profile 124 may include demographic data of patient; for example, and without limitation, patient profile 124 may include basic information about patient such as name, age, gender, ethnicity, socioeconomic status, and/or the like. In one or more embodiments, each patient profile 124 may also include patient's medical history; for example, and without limitation, patient profile may include a detailed record of the patient's past health conditions, medical procedures, hospitalizations, and illnesses such as surgeries, treatments, medications, and/or the like. In one or more embodiments, each patient profile 124 may include lifestyle information of patient; for example, and without limitation, patient profile 124 may include details about the patient's diet, exercise habits, smoking and alcohol consumption, and other behaviors that could impact patient's health. In one or more embodiments, patient profile 124 may include patient's family history; for example, and without limitation, patient profile 124 may include a record of hereditary diseases. A person of ordinary skill in the art, upon reviewing the entirety of this disclosure, will be aware of various types of data within patient profiles 124 that apparatus 100 may receive and process in accordance with this disclosure.

With continued reference to FIG. 1, in one or more embodiments, patient profile 124 may include a plurality of structure images, including images of the heart, and associated metadata. For the purposes of this disclosure, "metadata" are secondary data providing background information about one or more aspects of certain primary data that may potentially make it easier to track and/or work with the primary data. In one or more embodiments, a plurality of structure images may include a plurality of computed tomography (CT) scans of a given patient, which in some embodiments may include images of a patient's heart. For the purposes of this disclosure, computed tomography is a medical imaging technique that uses X-rays to capture cross-sectional images (slices) of a patient's body. By taking a plurality of slices, a CT scan creates a detailed 3D representation of internal structures. Other exemplary embodiments of structure images may include, without limitation, X-ray images, magnetic resonance imaging (MRI) scans, ultrasonic images including ICE frames, optical images, digital photographs, or any other form of visual data, as described above.

With continued reference to FIG. 1, at least a processor 104 may be configured to construct 3D model 120 using a computer vision module 132. For the purposes of this disclosure, a "computer vision module" is a computational component designed to perform one or more computer vision, image processing, and/or modeling tasks. In one or more embodiments, computer vision module 132 may receive patient profile 124 and generate model 120 as a function of a set of images (and associated metadata). In one or more embodiments, computer vision module 132 may include an image processing module, wherein one or more structure images may be pre-processed using the image processing module. For the purposes of this disclosure, an "image processing module" is a component designed to process digital images such as structure images described herein. For example, and without limitation, image processing module may be configured to compile a plurality of images of a multi-layer scan to create an integrated image. In one or more embodiments, image processing module may include a plurality of software algorithms that can analyze, manipulate, and/or otherwise enhance an image, such as, without limitation, a plurality of image processing techniques as described below. In one or more embodiments, computer vision module 132 may also include hardware components such as, without limitation, one or more graphics processing units (GPUs) that can accelerate the processing of a large number of images. In one or more embodiments, computer vision module 132 may be implemented with one or more image processing libraries such as, without limitation, OpenCV, PIL/Pillow, ImageMagick, and the like. In a nonlimiting example, in order to generate a structure model, one or more image processing tasks, such as noise reduction, contrast enhancement, intensity normalization, image segmentation, and/or the like, may be performed by computer vision module 132 on a plurality of CT scans to isolate specific structures, such as the heart and/or major vascular structures from surrounding tissues. In one or more embodiments, one or more machine learning models may be used to perform CT scans segmentations, for example, and without limitation, a U-net (i.e., a convolution neural network containing a contracting path as an encoder and an expansive path as a decoder, wherein the encoder and the decoder forms a U-shaped structure).

With continued reference to FIG. 1, in one or more embodiments, model 120 may be received from a statistical shape model 136. For the purposes of this disclosure, a "statistical shape model (SSM)" is a data structure representing, including, and/or utilizing a mathematical model that captures principal modes of variation in shape across a population of similar three-dimensional structures, such as, without limitation, cardiac anatomies and/or other internal structures. SSM 136 may capture a plurality of models 120 associated with a plurality of patients. In one or more embodiments, SSM 136 may be used to capture the variability in structures among different patients; for instance, SSM 136 of a specific structure, such as a human heart may be constructed from a plurality of heart images collected from a plurality of individuals. In one or more embodiments, when model 120 represents a heart, the model 120 generated from SSM 136 may capture an "average" heart shape and main ways in which heart shapes may vary among plurality of individuals. In a nonlimiting example, SSM 136 described herein may be consistent with any SSM disclosed in U.S. patent application Ser. No. 18/376,688, filed on Oct. 4, 2023, and entitled "APPARATUS AND METHODS FOR GENERATING A THREE-DIMENSIONAL (3D) MODEL OF CARDIAC ANATOMY VIA MACHINE-LEARNING," U.S. patent application Ser. No. 18/750,411, filed on Jun. 21, 2024, and entitled "APPARATUS AND METHODS FOR GENERATING A THREE-DIMENSIONAL (3D) MODEL OF CARDIAC ANATOMY VIA MACHINE-LEARNING," U.S. patent application Ser. No. 18/389,513, filed on Nov. 14, 2023, and entitled "APPARATUS AND METHODS FOR SYNTHETIZING MEDICAL IMAGES," U.S. patent application Ser. No. 18/426,604, filed on Jan. 30, 2024, and entitled "APPARATUS AND METHOD FOR GENERATING A THREE-DIMENSIONAL (3D) MODEL OF CARDIAC ANATOMY BASED ON MODEL UNCERTAINTY," U.S. patent application Ser. No. 18/648,176, filed on Apr. 26, 2024, and entitled "APPARATUS AND METHODS FOR VISUALIZATION WITHIN A THREE-DIMENSIONAL MODEL USING NEURAL NETWORKS," each of which is incorporated herein by reference in its entirety.

In further reference to FIG. 1, in an embodiment, the processor may be configured to generate a 3D model using SSM 152 and a prior point cloud distribution estimated from one or more of the modalities disclosed here within. For example, one or more modalities may include a patient profile, a plurality of TEE frames, a plurality of POCUS frames, a plurality of ICE frames, and/or the like. A "prior point cloud distribution" refers to a probabilistic representation of the possible locations or configuration of points in a multi-dimensional space. Here, the configuration of points may be derived from initial information across one or more data sources such as one or more modalities as mentioned above.

With continued reference to FIG. 1, in one or more embodiments, SSM 136 may be generated by processor 104 as a function of a set of labeled example shapes, each in a form of point-based representations or meshes. In one or more embodiments, example shapes may be represented in a 3D voxel occupancy representation (VOR). In one or more embodiments, model 120 may include a VOR of patient's heart. For the purposes of this disclosure, a "3D voxel occupancy representation" is a 3D digital representation of a spatial structure of the cardiac anatomy of a heart, wherein the representation is composed of a plurality of discrete volumetric elements known as voxels. For the purposes of this disclosure, a "voxel" is a 3D equivalent of a pixel used in 2D imaging. While a pixel represents a point in a 2D image and may include properties such as color and/or brightness, a voxel may represent a volume in a 3D space and may include additional properties such density/occupancy as described below. In one or more embodiments, each voxel within a plurality of voxels in 3D VOR may represent a specific portion of a given structure.

With continued reference to FIG. 1, in one or more embodiments, when model 120 and/or SSM 136 represents a heart, segmentation of the heart may include a plurality of pixel values, e.g., 0~255, each representing a presence of heart tissue at that location. In a nonlimiting example, computer vision module 132 may be configured to generate a mesh representation of a patient's heart based on plurality of CT scan segmentations or other image segmentations, wherein the mesh representation may include a 3D VOR, as described above, using Pix2Vox. Additionally or alternatively, exemplary computer vision tasks may include, without limitation, object recognition, feature detection, edge/corner detection, and the like. Nonlimiting examples of feature detection may include scale invariant feature transform (SIFT), canny edge detection, Shi Tomasi corner detection, and/or the like. In one or more embodiments, generating mesh representation of patient's heart may include employing, by computer vision module 132, one or more transformations to orient one or more images with respect to a 3D coordinate system; exemplary transformations include without limitation homography transforms and affine transforms. Computer vision module 132 may implement one or more 3D modeling algorithms, such as without limitation, marching cubes, contour detection and segmentation, active contour models, and/or the like to generate a coherent 3D representation based on mesh representation of an object, e.g., model 120. In one or more embodiments, generic 3D modeling techniques may be applied by computer vision module 132 to generate model 120. In one or more embodiments, generic 3D modeling techniques may include surface modeling, solid modeling, or parametric modeling, among others. A person of ordinary skill in the art, upon reviewing the entirety of this disclosure, will be aware of various image processing, computer vision, and modeling tasks that may be performed by processor 104 to generate model 120 from a set of structural images such as heart images.

With continued reference to FIG. 1, in one or more embodiments, voxel may be the smallest distinguishable box-shaped part (i.e., 1px×1px×1px) of 3D representation of a structure. In one or more embodiments, each voxel within a plurality of voxels in 3D VOR may be represented as a cube or rectangular prism (although other shapes may be used in specialized applications). Each voxel may include a size that determines the resolution of a 3D model. In one or more embodiments, smaller voxels may provide higher resolution; however, it may require more computational resources (e.g., RAM) for processor 104 to process. In one or more embodiments, each voxel may include one or more embedded values (i.e., specific numerical or categorical data associated with each voxel). In one or more embodiments, embedded values may represent various attributes or characteristics of the corresponding portion of heart that voxel represents. In a nonlimiting example, embedded values may include density values, intensity values, texture information, or any other quantitative measures that provide insights into the underlying content (e.g., tissue). In another nonlimiting example, each voxel may include a presence indicator, i.e., a data element that indicates a presence or absence (i.e., occupancy) of content within a portion of an object (e.g., structure, such as a heart), as described in U.S. patent application Ser. No. 18/376,688. Such embedded values may be derived from corresponding labels of example shape.

With continued reference to FIG. 1, in one or more embodiments, processor 104 may be configured to align a set of labeled example shapes to a common reference frame using rigid, affine, or otherwise nonrigid registration methods to generate SSM 136. For example, and without limitation, rigid registration may involve translations and rotations to superimpose the shapes; affine registration may incorporate scaling, shearing, and other linear transformations; nonrigid methods may employ B-splines, thin-plate splines, or diffeomorphic transformations to flexibly map one shape onto another. In one or more embodiments, an averaged position of each corresponding point (or voxel) across all example shapes may be calculated using formula $$\bar{p}_i = \frac{1}{N} \sum_{j=1}^{N} p_{ji},$$

where $\bar{p}_i$ is the mean position of the ith point (or voxel), $p_{ji}$ is the position of the ith point in the jth example shape, and N is the total number of example shapes in the labeled set. In one or more embodiments, principal component analysis (PCA) may be applied to the aligned shapes to extract at least a primary mode of variation. For the purposes of this disclosure, a "primary mode of variation" is a mode of variation that has the most significant variability. For the purposes of this disclosure, a "mode of variation" is a specific pattern or direction of a shape change. In one or more embodiments, such significancy may be indicated by a first principal component in PCA. In one or more embodiments, a plurality of modes of variation may be extracted, wherein each mode (or principal component) may represent a specific way a shape may be deformed from a mean shape, determined by one or more eigenvectors of the covariance matrix of the aligned shapes. In a nonlimiting example, eigenvector with the highest eigenvalue may represent a primary mode of variation which captures the largest amount of shape variability within example shapes, while subsequent modes (eigenvectors) capture decreasing amounts of variability.

With continued reference to FIG. 1, in one or more embodiments, once modes of variation are extracted, processor 104 may be configured to create a shape representation for any given shape within a studied class. In one or more embodiments, model 120 may be constructed using SSM 136, wherein model 120 may integrate mean shape and plurality of modes of variation. In a nonlimiting example, model 120 having a shape S may be mathematically represented as $$S = \bar{S} + \sum_{k=1}^{M} a_k \times \phi_k,$$

wherein $\bar{S}$ denotes mean shape derived from set of example shapes, M is the number of modes of variation considered, $\alpha_k$ are the coefficients or weights for each mode, and $\phi_k$ are the modes of variation (eigenvectors corresponding to the kth principal component). In one or more embodiments, coefficients $\alpha_k$ may dictate a degree to which each mode of variation is present in shape S. In one or more embodiments, coefficients $\alpha_k$ may vary from positive to negative (or negative to positive) based on a deformation of model 120 in directions described by each mode of variation. In one or more embodiments, model 120 may include mean shape as described herein. In one or more embodiments, model 120 may include a predictive shape that may not have been explicitly seen in example shapes or observations. In one or more embodiments, model 120 may be in 3D VOR as described above.

With continued reference to FIG. 1, in one or more embodiments, processor 104 may be configured to perform shape extraction from segmented CT scans or other similar medical images, as described above. For example, and without limitation, marching cubes algorithm or similar techniques may be employed to convert a voxel-based representation from CT segmentation into mesh, wherein the mesh may represent the outer surface of a structure, for example a patient's heart. In one or more embodiments, mesh may vary in resolutions, with more grid capturing finer details. In one or more embodiments, a consistent number of landmark points may be used to represent patient's structure surface. In a nonlimiting example, one or more landmark points may be manually annotated by medical professionals to ensure that the landmark points correspond to specific anatomical locations of patient's structure. In one or more embodiments, one or more landmark points may be automatically derived using one or more computer vision algorithms as described herein. Landmark points may be uniformly spaced across the surface of extracted shape. In one or more embodiments, the size of structure shape may be normalized so that the number of landmark points remain consistent between different structure shapes. In one or more embodiments, SSM 136 may include an implementation of generalized Procrustes analysis (GPA) to find a desired rigid transformation (translation, rotation) that aligns with example shapes. In a nonlimiting example, processor 104 may be configured to minimize the sum of squared distance between corresponding landmark points across each structure shape. In one or more embodiments, size normalization may be reverted after such alignment. Constructing model 120 may include combining mean shape computed by averaging positions of corresponding landmarks points and one or more modes of variations. In a nonlimiting example, model 120 may include a template model generated based on a plurality of standard templates, as described in U.S. patent application Ser. No. 18/376,688.

With continued reference to FIG. 1, in one or more embodiments, model 120, such as any structure model as discussed throughout this disclosure, may be constructed by extracting images, such as corresponding structure images, from patient profile 124 (subsequent to patient identity verification and obtaining consent from subject). In one or more embodiments, patient profile 124 may be obtained through hospital information system (HIS) or any other data acquisition platform to securely access patient's electronic medical record (EMR) or other relevant databases. Images such as structure images may be directly or indirectly downloaded or exported. In one or more embodiments, each CT scan within structure images may be in a usable and/or computer-readable format such as, without limitation, DICOM format, and necessary metadata such as, without limitation, patient information, study information, image modality, CT scanner information, slice thickness, pixel spacing, matrix size, and/or the like may be included. In one or more embodiments, metadata may also include acquisition parameters such as, without limitation, tube voltage (kV), tube current (mA), exposure time, total dose length product (DLP), CT dose index (CTDI), rotation time, number of acquisitions, contrast agent used (if any), contrast phase, and/or the like. In one or more embodiments, receiving model 120 may include recording an access and extraction of structure images from patient profile 124; for instance, and without limitation, this process may be documented, by processor 104, in patient's medical record, database 128, and/or other appropriate logs.

With continued reference to FIG. 1, in one or more embodiments, model 120 may be directly imported from database 128 or a similar repository containing pre-constructed models. In one or more embodiments, database 128 may be based on historical patient scans, expert-constructed models, and/or the like. For instance, and without limitation, a structure model, for example a heart model, repository may consist of models derived from a diverse population, capturing various structure-specific pathologies, anomalies, or physiological states. Database 128 may be implemented, without limitation, as a relational database, a key-value retrieval database such as a NoSQL database, or any other format or structure for use as database that a person of ordinary skill in the art would recognize as suitable upon review of the entirety of this disclosure. Database 128 may alternatively or additionally be implemented using a distributed data storage protocol and/or data structure, such as a distributed hash table or the like. Database 128 may include a plurality of data entries and/or records as described above. Data entries in database 128 may be flagged with or linked to one or more additional elements of information, which may be reflected in data entry cells and/or in linked tables such as tables related by one or more indices in database 128 or another relational database. A person of ordinary skill in the art, upon reviewing the entirety of this disclosure, will be aware of various ways in which data entries in database 128 may store, retrieve, organize, and/or reflect data and/or records as used herein, as well as categories and/or populations of data consistently with this disclosure.

With continued reference to FIG. 1, in one or more embodiments, patient profile 124 may further include ECG data. For the purposes of this disclosure, "ECG data" are data related to an electrocardiogram of patient that corresponds to patient profile 124. As a nonlimiting example, ECG data may accompany query images, such as ICE frame as described in further detail below. For the purposes of this disclosure, an "electrocardiogram" is a recording of electrical activity of patient's heart over a period of time. In one or more embodiments, ECG data may include one or more recordings captured by a plurality of electrodes placed on patient's skin. In one or more embodiments, ECG data may include information regarding a P wave, T wave, QRS complex, PR interval, ST segment, and/or the like. In one or more embodiments, ECG data may be used to identify specific cardiac events or phases of a cardiac cycle, e.g., isovolumic relaxation, ventricular filling, isovolumic contraction, and rapid ventricular ejection. In a nonlimiting example, patient profile 124 and ECG data described herein may be consistent with any patient profile and ECG data disclosed in U.S. patent application Ser. No. 18/229,854, filed on Aug. 3, 2023, entitled "APPARATUS AND METHOD FOR DETERMINING A PATIENT SURVIVAL PROFILE USING ARTIFICAL INTELLIGENCE-ENABLED ELECTROCARDIOGRAM (ECG)", the entirety of which is incorporated herein by reference.

With continued reference to FIG. 1, in one or more embodiments, model 120 may be directly imported from one or more external sources. In a nonlimiting example, model 120 may be received from dedicated computer software, e.g., specialized software solutions available for medical imaging and 3D model generation. In one or more embodiments, model 120 may be exported from such software which may provide model segmentation, rendering, and generation capabilities tailored for cardiac structures. In another nonlimiting example, one or more third-party platforms (for patient data management, diagnostic imaging, and other healthcare functionalities) that support DICOM standards may allow for extraction and sharing model 120 for synthesizing medical images as described in detail below. In a nonlimiting example, model 120 may be received from several medical imaging and modeling services that are available on cloud. Such model 120 may be sourced from a cloud-based service (e.g., SaaS).

With continued reference to FIG. 1, model 120 includes a plurality of regions of interest (ROIs) 120; in one or more embodiments, each ROI 116 within the plurality of ROIs may correspond to one query image 112 and may be specified when the query image 112 is matched to a corresponding synthetic image within a synthetic image repository, as described below. For the purposes of this disclosure, a "region of interest (ROI)" 116 is a specific and pre-defined spatial subset of an image or a 3D model at a specific position and orientation. For example, in some embodiments, a ROI may include a slice extracted at a specific position and orientation in a 3D model. In one or more embodiments, ROI 116 may include a volume that has been designated for closer analysis or further processing as described in detail below due to its potential significance or relevance in synthesizing images. In one or more embodiments, identifying ROI 116 within model 120 may include isolating ROI 116 from surrounding structure or structures that may be less relevant. In one or more embodiments, ROI 116 may be manually selected by user. In one or more embodiments, one or more graphical tools and/or imaging software may be used to outline a particular area within model 120 or an image captured from model 120. In one or more embodiments, processor 104 may be configured to automatically detect and define ROI 116. In one or more embodiments, a computer vision module 132 configured to perform one or more computer vision tasks such as, without limitation, thresholding, edge detection, or machine learning process may be used to recognize ROI 116 with specific features or anomalies.

With continued reference to FIG. 1, in one or more embodiments, ROI 116 may also include temporal ROI. In one or more embodiments, ROI 116 may be not only spatial, but also temporal. In one or more embodiments, a specific timeframe within a sequence may be designated as a ROI. In a nonlimiting example, temporal ROI may focus on a specific time segment or interval within a dynamic dataset, e.g., model 120, with an animation that simulates a cardiac cycle. In one or more embodiments, temporal ROI may change over time. For example, and without limitation, temporal ROI may include a time-series images capturing patient's heart activity, or a sequence showcasing blood flow within the cardiac structure. In a nonlimiting example, ROI 116 may include temporal ROI set to capture a specific phase of cardiac cycle such as systole or diastole. In one or more embodiments, ROI 116 may include a hierarchical ROI. In a nonlimiting example, processor 104 may identify one or more smaller sub-ROIs within a larger ROI, each with its significance or weight.

With continued reference to FIG. 1, in or more embodiments, ROI 116 may include a at least a field of view 140. Each field of view 140 may include at least a portion of model 120 and/or may further include at least a point of view 144 and at least a view angle 148. For the purposes of this disclosure, a "point of view" is a specific spatial location or origin form which an image or scene is observed or captured. In a nonlimiting example, point of view 144 may be configured to mimic the location of an image capture device such as an ICE catheter, within or near patient's structure, such as their heart. In one or more embodiments, at least a point of view 144 may be imagined as the location of a virtual image capture device. In one or more embodiments, at least a point of view 144 may determine from where within model 120 or its vicinity "pseudo" ultrasound waves are emitted and/or received. Given that ICE is a type of endoluminal ultrasound, in one or more embodiments, at least a point of view 144 may be intracardiac and located inside heart chambers. Exemplary point of views 144 may include, without limitation, ventricular point of view, atrial point of view, near-valvular point of view, and/or the like. In a nonlimiting example, ROI 116 may be identified and at least a point of view 144 may be located on the left ventricle's wall, targeting its thickness and motion to assess potential cardiomyopathy. For the purposes of this disclosure, a "view angle" is an angular orientation or direction (i.e., defined by one or more $\theta$ and $\varphi$ angles within spherical coordinates) associated with and projected from at least a point of view 144. In one or more embodiments, view angle 148 may determine the segment of a scene or image that is visible or captured. In a nonlimiting example, view angle 148 may reflect the orientation of an imaging plane relative to the structure of interest within identified ROI 116. In one or more embodiments, view angle 148 corresponding to at least a point of view 144 may define the tilt of the imaging plane, determining which structures come into field of view 140. In one or more embodiments, field of view 140 may indicate an area of a scene that may be captured by image capture device within defined bounds (e.g., spatial boundary of ROI 116) inside model 120. Exemplary view angle 148 may include apical view (visualize patient's heart from its apex), parasternal view (oriented laterally from the midsternal line), subcostal view (with angle inferiorly positioned). In one or more embodiments, view angle 148 may correspond to the angle of the sector of a resultant medical image, such as an ICE image as described in detail below (which resembles a sector or pie slice shape), wherein an ICE catheter tip may act as the sector's apex (i.e., point of view 144) that delineates an ultrasound wave's spread and hence, the width of captured anatomy. In a nonlimiting example, a narrower view angle may be chosen to focus on a specific region of patient's structure, such as their heart e.g., a valve. Conversely, a broader view angle may capture a more extensive structure region, offering a comprehensive overview of model 120.

With continued reference to FIG. 1, in one or more embodiments, one or more machine learning models may be used to perform a certain function or functions of apparatus 100, such as generating at least a synthetic image, extracting neural network encodings of at least a medical image, generating a plurality of shape parameters, and querying synthetic image repository, as described in detail below. Processor 104 may use a machine learning module to implement one or more algorithms as described herein or generate one or more machine learning models, such as a pattern recognition model, as described below. However, machine learning module is exemplary and may not be necessary to generate one or more machine learning models and perform any machine learning described herein. In one or more embodiments, one or more machine learning models may be generated using training data. Training data may include inputs and corresponding predetermined outputs so that machine learning model may use correlations between the provided exemplary inputs and outputs to develop an algorithm and/or relationship that then allows the machine learning model to determine its own outputs for inputs. Training data may contain correlations that a machine learning process may use to model relationships between two or more categories of data elements. Exemplary inputs and outputs may come from database 128 or be provided by a user. In one or more embodiments, machine learning module may obtain training data by querying communicatively connected database 128 that includes past inputs and outputs. Training data may include inputs from various types of databases, resources, and/or user inputs and outputs correlated to each of those inputs, so that machine learning model may determine an output. Correlations may indicate causative and/or predictive links between data, which may be modeled as relationships, such as mathematical relationships, by machine learning models, as described in further detail below. Training data may include one or more training datasets. In one or more embodiments, training data may be formatted and/or organized by categories of data elements by, for example, associating data elements with one or more descriptors corresponding to categories of data elements. As a nonlimiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In one or more embodiments, training data may include previous outputs such that one or more machine learning models may iteratively produce outputs.

Still referring to FIG. 1, in some embodiments, a training dataset may be identified by correlating an instance of computed tomography scan data with a historical ultrasonic image as a function of a medical record and a language model. For example, a language model may be used to interpret a medical record and/or determine whether an instance of computed tomography scan data should be associated with a historical ultrasonic image in a training dataset. For example, a language model may be used to interpret language of a medical record, and the output of the language model may be used to identify whether a medical event has taken place between when the historical ultrasonic image was taken and when the historical computed tomography scan data was recorded, such that they are not to be associated in a training dataset. In another example, a language model may be used to interpret language of a medical record, and the output of the language model may be used to identify whether historical ultrasonic image and historical computed tomography scan data were recorded in a sufficiently short time, such that they are associated in a training dataset. In some embodiments, a training dataset may be identified by generating a synthetic ultrasonic image as a function of an instance of computed tomography scan data.

Further referring to FIG. 1, in one or more embodiments, training data may include structure training data. In some embodiments, structure training data may include historical ultrasonic images correlated with historical computed tomography scan data and modes of variation. Historical ultrasonic images may include collected structure data and/or synthetic structure data. Such a training dataset may be used to train statistical shape model 152 to generate a set of shape parameters representing a structure's shape as a function of a set of ultrasonic images, which may be input into the model in order to receive, as an output, a set of shape parameters including a structure's variation in comparison to similar structure shapes.

In continued reference to FIG. 1, in one or more embodiments, SSM 152 may be iteratively retrained using outputs of SSM 152. Further, in some embodiments, real-time updates may occur wherein SSM 152 is trained using live ultrasonic images and position and orientation information related to one or more ROIs. Such data may be directly acquired from system 100 and/or by estimation using another machine-learning model, wherein point clouds are extracted from the correlated data.

With continued reference to FIG. 1, in one or more embodiments, processor 104 may implement one or more aspects of "generative artificial intelligence (AI)", a type of AI that uses machine learning algorithms to create, establish, or otherwise generate data such as, without limitation, synthetic medical images as described below that are similar to one or more training medical images within training data. In one or more embodiments, machine learning module described herein may generate one or more generative machine learning models that are trained on one or more set of example medical images previously generated. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

With continued reference to FIG. 1, in one or more embodiments, upon receiving query image 112, processor 104 is configured to extract neural network encodings 152 as a function of the received query image 112. For the purposes of this disclosure, "neural network encodings" are a plurality of parameters extracted by one or more neural networks that collectively describe features of a system and/or connections between elements therein; neural network encodings may include weights/biases/coefficients of neural network nodes, embeddings (vectors) generated by the neural networks, or a combination thereof. In one or more embodiments, neural network encodings 152 may be extracted by generating a plurality of shape parameters 156. In one or more embodiments, plurality of shape parameters 156 may be generated by training a pattern recognition model 160, as described below. In one or more embodiments, neural network encodings 152 may be extracted based on generated plurality of shape parameters 156. Details regarding the principles of neural networks and their implementations are described below.

With continued reference to FIG. 1, for the purposes of this disclosure, a "shape parameter" is a numerical value or descriptor that quantitatively represents geometric or morphological characteristics of patient's heart. In a nonlimiting example, plurality of shape parameters 156 may include information and/or metadata calculated, determined, and/or extracted from query image 112 and/or plurality of synthetic medical images as described below, such as, dimensions, angles, curvatures, areas, texture, symmetry, and/or the like. In one or more embodiments, processor 104 may be configured to parameterize (model) features (e.g., edges, textures, contours, and the like) using convolutional neural networks, as described in detail below. Such parameterization may involve processor 104 to derive one or more shape parameters 156 including one or more morphological descriptors that quantitatively describe an object, such as a structure, for example a patient's heart, based on extracted features.

With continued reference to FIG. 1, in general, generating plurality of shape parameters 156 may include i) receiving pattern recognition training data 164 comprising a plurality of training images as inputs correlated to plurality of shape parameters 156 as outputs; ii) training pattern recognition model 160 using the pattern recognition training data 164; and iii) generating the plurality of shape parameters 156 using the pattern recognition model. In one or more embodiments, pattern recognition training data 164 may include actual images, such as actual medical images (e.g., actual ICE frames) collected and/or saved by a medical professional or retrieved from patient profile 124 and/or database 128. In one or more embodiments, pattern recognition training data 164 may contain synthetic images, such as synthetic medical images, as described below. In one or more embodiments, pattern recognition training data 164 may be filtered, replaced, and/or otherwise updated as a function of one or more user inputs. In some embodiments, pattern recognition training data may include historical ultrasonic images correlated with historical computed tomography scan data. Such a training dataset may be used to train a model to generate a set of shape parameters representing a structure's shape as a function of a set of ultrasonic images, which may be input into the model in order to receive, as an output, a set of shape parameters. In some embodiments, each shape parameter within a set of shape parameters may be associated with and/or comprise a corresponding parameter range. Such a parameter range may, for example, include a range of values associated with a normal and/or healthy structure. Such a parameter range may be determined based on, for example, a subset of possible values of a parameter which historical healthy structures commonly fall into, as determined from a dataset.

With continued reference to FIG. 1, in one or more embodiments, processor 104 is further configured to query a synthetic image repository 168 for at least a matching synthetic image 172 based on extracted neural network encodings 152 of query image 112. Synthetic image repository 168 includes plurality of synthetic images 172 (e.g., a plurality of synthetic ICE frames, as described in detail below), and neural network encodings 152 are extracted from each synthetic image 172 by following the same or similar procedures as described above for query image 112. Synthetic image repository 168 may be implemented in any manner suitable for implementation of database 128, as described in this disclosure. Each synthetic image 172 has a one-to-one correspondence with ROI 116, field of view 140, point of view 144, and/or view angle 148 within 3D model 120. In one or more embodiments, each synthetic image 172 may be stored in database 128 alongside its corresponding neural network encodings, ROI 116, field of view 140, point of view 144, and/or view angle 148. Querying synthetic image repository 168 involves comparing extracted neural network encodings 152 of query image 112 with extracted neural network encodings 152 of each synthetic image 172 within the plurality of synthetic images 172. For the purposes of this disclosure, a "matching" synthetic image is a synthetic image with the same neural network encodings (i.e., embeddings or vectors, as described above), the same overall geometric features, and the same pattern of organization between elements therein as query image 112.

With continued reference to FIG. 1, generation of synthetic images 172 described in this disclosure may be consistent with any apparatus and/or methods disclosed in U.S. patent application Ser. No. 18/509,520, filed on Nov. 15, 2023, and entitled "APPARATUS AND METHODS FOR SYNTHETIZING MEDICAL IMAGES", the entirety of which is incorporated herein by reference. In one or more embodiments, plurality of synthetic images 172 is generated by executing a camera transformation program 176 configured to simulate at least a perspective of image capture device such as ICE catheter. For the purposes of this disclosure, a "camera transformation program" is a software or algorithm that manipulates location, perspective, and orientation of a virtual camera in relation to an object or scene. In one or more embodiments, camera transformation program 176 may be executed to effectively transform or alter how ROI 116 within model 120 is visualized, simulating the effects of physically moving or adjusting a real-world camera or image capture device, such as ICE catheter or the like. In one or more embodiments, camera transformation program 176 may involve moving at least a virtual camera's position in 3D space. In one or more embodiments, virtual camera may be placed at the at least a point of view 144 and/or the at least a view angle 148. In one or more embodiments, virtual camera may be in the same object space as model 120. In a nonlimiting example, camera transformation program 176 may include translation configured to shift camera left, right, up, down, forward, or backward. In one or more embodiments, camera transformation program 176 may include one or more instructions on configuring virtual camera's orientation based on a horizontal or vertical axis. For example, and without limitation, virtual camera may be configured to pitch (tilt up or down), yaw (turn left or right), or roll (tilt sideways). In one or more embodiments, camera transformation program 176 may adjust virtual camera's perspective to "zoom" in or out on model 120. In one or more embodiments, camera transformation program 176 may be implemented through one or more image generators, as described below.

With continued reference to FIG. 1, in one or more embodiments, executing camera transformation program 176 may include generating a 2D projection 180 of 3D structures by rendering ROI 116 as a function of a set of imaging parameters using virtual camera positioned at the ROI 116. For the purposes of this disclosure, a "2D projection" is a projection of 3D structures, such as a part of model 120, onto a 2D projection plane. In one or more embodiments, 2D projection plane may be a pre-selected and/or standardized projection plane, such as the three orthogonal planes (xy plane, yz plane, and xz plane) defined within the Cartesian coordinates. In one or more embodiments, such 2D projection of 3D structures may capture spatial and/or morphological features of one or more structures as described herein as they would appear from at least a point of view 144, from at least a view angle 148, and/or under certain imaging parameters. For the purposes of this disclosure, a "set of imaging parameters" refers to a collection of specific variables and configurations (of virtual camera) that determines how synthetic image 172 may be generated, processed, and/or visualized. In one or more embodiments, set of imaging parameters may replicate one or more intricacies of real-world imaging, such as collection of ICE frames. In one or more embodiments, users, e.g., clinicians or medical professionals, may manually set or adjust set of imaging parameters through user interface as described below. In one or more embodiments, set of imaging parameters may be autodetected based on an initial generation of synthetic image 172 and/or preliminary data. For example, and without limitation, set of image parameters may include a pre-defined subset of parameters configured for viewing particular structure regions or structures of mean shape. One or more machine learning models as described herein may be implemented to adjust set of image parameters iteratively based on the quality or clarity of an initial scan until desired synthetic image 172 is achieved.

With continued reference to FIG. 1, in a nonlimiting example, camera transformation program 176 may be configured to simulate projection as if image capture device is inserted from the apex of patent's heart and angled towards the mitral valve, giving a detailed view of the valve's leaflets and adjoining heart structures. In one or more embodiments, camera transformation program 176 may be configured to determine how 3D objects, e.g., model 120, are projected onto a 2D visual plane. Exemplary image projections may include, without limitation, orthographic (parallel) projection, perspective (converging lines) projection, and the like. In a nonlimiting example, for a close-up detailed view of ROI 116 without depth distortions, an orthographic projection may be preferred, while for a more holistic view of how structures relate to one another in 3D space, a perspective projection may be more appropriate.

With continued reference to FIG. 1, in one or more embodiments, for certain query image 112, there may only be "near matches" instead of exact matches (e.g., based on matching vectors between extracted neural network encodings) within synthetic image repository 168. In one or more embodiments, when only one near match is detected, processor 104 may be configured to sample around the near match (e.g., within a certain threshold distance and/or angle) to identify an exact match. In one or more embodiments, when two or more near matches are detected, processor 104 may be configured to interpolate between the two or more near matches to identify a 2D projection 180 that is an exact match. Details regarding how 2D projections may be generated are described above in this disclosure.

With continued reference to FIG. 1, in one or more embodiments, processor 104 may be configured to generate at least a synthetic image 172 (e.g., a synthetic ICE frame) using at least an image generator. For the purposes of this disclosure, an "image generator" is a system, apparatus, and/or software module designed to produce or synthesize visual representations (images) based on certain input data. In one or more embodiments, image generator may be configured to generate at least a synthetic image 172 based on input data such as, without limitation, model 120, ROI 116, point of view 144, and view angle 148, among others. In one or more embodiments, generation performed by image generator may be rooted in real-world data, simulated data, or a combination thereof. In one or more embodiments, image generator may include a software component that processes raw data from one or more imaging device, e.g., MRI, CT, or ultrasound machines, and reconstruct them into interpretable visual displays.

With continued reference to FIG. 1, in one or more embodiments, image generator may include a generative machine learning module, such as an image translation module, equipped with one or more generative models. For the purposes of this disclosure, a "generative model" is a statistical model of joint probability distribution P(X,Y) on a given observable variable, x, representing features or data that can be directly measured or observed (e.g., model 120, heart images, and/or associated metadata, among others) and target variable, y, representing outcomes or labels that one or more generative models aims to predict or generate (e.g., synthetic image 172). Exemplary generative models include generative adversarial models (GANs), diffusion models, and the like. In one or more embodiments, generative models may rely on Bayes theorem to find joint probability; for instance, and without limitation, naive Bayes classifiers may be employed by computing device to categorize input data such as, without limitation, model 120 derived from CT scans into different views.

With continued reference to FIG. 1, in a nonlimiting example, one or more generative machine learning models may include one or more naive Bayes classifiers generated, by processor 104, using a naive bayes classification algorithm. Naive Bayes classification algorithm may generate classifiers by assigning class labels to problem instances, represented as vectors of element values. Class labels are drawn from a finite set. Naive Bayes classification algorithm may include generating a family of algorithms that assume that the value of a particular element is independent of the value of any other element, given a class variable. Naive Bayes classification algorithm may be based on Bayes Theorem expressed as P(A/B)=P(B/A)×P(A)÷P(B), where P(A/B) is the probability of hypothesis A given data B, also known as posterior probability; P(B/A) is the probability of data B given that the hypothesis A was true; P(A) is the probability of hypothesis A being true regardless of data, also known as prior probability of A; and P(B) is the probability of data regardless of the hypothesis. A naive Bayes algorithm may be generated by first transforming training data into a frequency table. Processor 104 may then calculate a likelihood table by calculating probabilities of different data entries and classification labels. Processor 104 may utilize a naive Bayes equation to calculate a posterior probability for each class. A class containing the highest posterior probability is the outcome of prediction.

With continued reference to FIG. 1, although naive Bayes classifier may be primarily known as a probabilistic classification algorithm; however, it may also be considered a generative model described herein due to its capability of modeling the joint probability distribution P(X,Y) over observable variables, X, and target variable, Y. In one or more embodiments, naive Bayes classifier may be configured to make an assumption that the features, X, are conditionally independent given class label, Y, allowing generative model to estimate a joint distribution as P(X,Y)=P(Y)ΠiP($X_i$|Y), wherein P(Y) is the prior probability of the class, and P($X_i$|Y) is the conditional probability of each feature given the class. One or more generative machine learning models containing naive Bayes classifiers may be trained on labeled training data, estimating conditional probabilities P($X_i$|Y) and prior probabilities P(Y) for each class; for instance, and without limitation, using techniques such as Maximum Likelihood Estimation (MLE). One or more generative machine learning models containing naive Bayes classifiers may select a class label y according to prior distribution, P(Y), and for each feature $X_i$, sample at least a value according to conditional distribution, P($X_i$|y). Sampled feature values may then be combined to form one or more new data instances with selected class label, y. In a nonlimiting example, one or more generative machine learning models may include one or more naive Bayes classifiers to generate new synthetic images 172, such as synthetic ICE frames, as a function of input data such as, without limitation, at least a point of view 144 and at least a view angle 148, wherein the models may be trained using training data containing plurality of models 120 and ROIs 120, as described herein as input correlated to plurality of synthetic images 172.

With continued reference to FIG. 1, in one or more embodiments, processor 104 may be configured to continuously monitor image generator. In an embodiment, processor 104 may configure discriminator to provide ongoing feedback and further corrections as needed to subsequent input data. An iterative feedback loop may be created as processor 104 continuously receives real-time data, identifies errors (e.g., distance between generated synthetic image 172 and real images) as a function of real-time data, delivering corrections based on the identified errors and monitoring subsequent model outputs and/or user feedback on the delivered corrections. In one or more embodiments, processor 104 may be configured to retrain one or more generative machine learning models within image generator based on user modified/annotated images or update training data of one or more generative machine learning models within image generator by integrating validated images (i.e., subsequent model output) into original training data. In such embodiment, iterative feedback loop may allow image generator to adapt to user's needs and performance requirements, enabling one or more generative machine learning models described herein to learn and update based on user responses and generated feedback. Other exemplary embodiments of generative machine learning models may include, without limitation, long short-term memory networks (LSTMs), (generative pre-trained) transformer (GPT) models, mixture density networks (MDN), and/or the like. A person of ordinary skill in the art, upon reviewing the entirety of this disclosure, will be aware of various generative machine learning models that may be used to synthetize images as described herein.

With continued reference to FIG. 1, in one or more embodiments, image generator may be further configured to generate a multimodal neural network that combines various neural network architectures described herein. In a nonlimiting example, multimodal neural network may combine LSTM for time-series analysis with GPT models for natural language processing. Such fusion may be applied by computing device to generate synthetic image 172. In one or more embodiments, multimodal neural network may also include a hierarchical multimodal neural network, wherein the hierarchical multimodal neural network may involve a plurality of layers of integration. For instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multimodal neural network may include, without limitation, ensemble-based multimodal neural network, cross-modal fusion, adaptive multimodal network, among others. A person of ordinary skill in the art, upon reviewing the entirety of this disclosure, will be aware of various multimodal neural networks and combination thereof that may be implemented by apparatus 100 in accordance with this disclosure.

With continued reference to FIG. 1, in one or more embodiments, processor 104 may be configured to generate at least a synthetic image 172 using a generative adversarial network (GAN). For the purposes of this disclosure, a "generative adversarial network" is a type of artificial neural network with at least two sub models (i.e., neural networks), a generator and a discriminator, that compete against each other in a process that ultimately results in the generator learning to generate new data samples, wherein the "generator" is a component of the GAN that learns to create hypothetical data by incorporating feedback from the "discriminator" configured to distinguish real data from the hypothetical data. In one or more embodiments, generator may learn to make discriminator classify its output as real. In one or more embodiments, discriminator may include a supervised machine learning model while generator may include an unsupervised machine learning model, as described in further detail below.

With continued reference to FIG. 1, in one or more embodiments, discriminator may include one or more discriminative models, i.e., models of conditional probability $P(Y|X=x)$ of target variable, Y, given observed variable, X.

In one or more embodiments, discriminative models may learn boundaries between classes or labels in given training data. In a nonlimiting example, discriminator may include one or more classifiers as described in further detail below to distinguish between different categories, e.g., real vs. fake, or states, e.g., TRUE vs. FALSE within the context of generated data such as, without limitations, synthetic images 172, and/or the like. In one or more embodiments, processor 104 may implement one or more classification algorithms such as, without limitation, Support Vector Machines (SVM), Logistic Regression, Decision Trees, and/or the like to define decision boundaries.

With continued reference to FIG. 1, in a nonlimiting example, generator of GAN may be responsible for creating synthetic data, such as synthetic images 172 (e.g., synthetic ICE frames), that resemble true medical images (e.g., actual ICE frames). In one or more embodiments, GAN may be configured to receive model 120 and/or set of images as input and generate corresponding examples of synthetic images 172 containing information describing a 3D structure in different fields of view 140. In one or more embodiments, processor 104 may be configured to train GAN using a plurality of 2D projections 180 as described above and generating at least a synthetic image 172 using the trained GAN at ROI 116, field of view 140, point of view 144, and/or view angle 148. In one or more embodiments, when generating at least a synthetic image 172, discriminator of GAN may evaluate the authenticity of the synthetic image 172 by comparing it to true medical images; for example, discriminator may distinguish between genuine and generated ultrasonic images, such as ICE frames, and provide feedback to generator to improve the model performance. Additionally or alternatively, GAN may include a conditional GAN as an extension of the basic GAN as described herein that allows for generation of synthetic images 172 using model 120 and/or set of images based on certain labels. In standard GAN, generator may produce samples from random noise, whereas in conditional GAN, generator may produce samples based on random noise and a given condition or label.

With continued reference to FIG. 1, additionally or alternatively, one or more generative models may also include a variational autoencoder (VAE). For the purposes of this disclosure, a "variational autoencoder" is an autoencoder (i.e., an artificial neural network architecture) whose encoding distribution is regularized during the model training process in order to ensure that its latent space includes desired properties allowing new data sample generation. In one or more embodiments, VAE may include a prior and noise distribution respectively, trained using expectation-maximization meta-algorithms such as, without limitation, probabilistic PCA, sparse coding, among others. In a nonlimiting example, VAE may use a neural network as an amortized approach to jointly optimize across input data and output a plurality of parameters for corresponding variational distribution as it maps from a known input space to a low-dimensional latent space. Additionally or alternatively, VAE may include a second neural network, for example, and without limitation, a decoder, wherein the "decoder" is configured to map from latent space to input space.

With continued reference to FIG. 1, in one or more embodiments, generating at least a synthetic image 172 using generative model may specifically involve training an image translation model 184. For the purposes of this disclosure, an "image translation model" is a machine learning model configured to map images from a first domain to a second domain while preserving the content of the first domain. Implementation of image translation model 184 may be consistent with any details related to machine learning described in this disclosure without limitation. In one or more embodiments, image translation model 184 may be configured to perform unpaired image-to-image translation, wherein no pair information is established between first domain and second domain. Specifically, processor 104 may be configured to i) receive image translation training data comprising a plurality of training images and a plurality of training 2D projections; ii) train image translation model 184 by correlating the plurality of training images with the plurality of training 2D projections; and iii) synthesize the at least a synthetic image 172 as a function of at least a 2D projection 180 using the trained image translation model 184. In one or more embodiments, training images may include at least a real image, such as a real ICE frame collected by medical professional. In one or more embodiments, training images may be retrieved from patient profile 124, database 128, or another image repository of similar nature. Training 2D projections may include any type of 2D projections and/or be consistent with any method of generating 2D projections described above in this disclosure. A trained image translation model 184 may be able to use one or more 2D projections 180 generated from 3D model 120 to generate at least a synthetic image 172, such as a synthetic ICE frame, that resembles a real image, such as a real ICE frame, without receiving any real image as input.

With continued reference to FIG. 1, processor 104 is configured to display an estimated ROI 188 of query image 112 within 3D model 120. For the purposes of this disclosure, an estimated ROI is an approximate fraction within 3D model 120 that significantly overlaps with the actual ROI 116 for query image 112 with a reasonable level of certainty; in other words, an estimated ROI may deviate slightly from actual ROI 112, but the deviation is minor enough ensure the overall precision of apparatus 100 during its operation, e.g., a medical procedure. In one or more embodiments, estimated ROI 188 may be a function of ROI 116 associated with matching synthetic image 172 from query. In one or more embodiments, displaying estimated ROI 188 may include overlaying a 2D cross section 192 within at least a portion of 3D model 120, as described below. In one or more embodiments, estimated ROI 188 and/or elements related thereto may be displayed on one or more display devices 196, as described below.

With continued reference to FIG. 1, apparatus 100 may further include or be coupled to at least a display device 196. For the purposes of this disclosure, a "display device" is an electronic device that visually presents information to user. In one or more embodiments, display device 196 may include an output interface that translates data such as, without limitation, synthetic image 172, from processor 104 or other computing devices into a visual form that can be easily understood by user. In one or more embodiments, synthetic image 172 and/or other data described herein such as, without limitation, model 120, patient profile 124, and/or the like may also be displayed through display device 196 using a user interface. User interface may include a graphical user interface (GUI), wherein the GUI may include a window in which query image 112, plurality of synthetic image 172, among other data described herein, may be displayed. In one or more embodiments, user interface may include one or more graphical locator and/or cursor facilities allowing user to interact with query image 112, synthetic image 172, and/or any other data, or even process described herein; for instance, and without limitation, by using a touchscreen, touchpad, mouse, keyboard, and/or other manual data entry device, user may enter user input containing selecting specific regions, adding comments, adjusting parameter, and/or the like. In a nonlimiting example, user interface may include one or more menus and/or panels permitting selection of measurements, models, visualization of data/model to be displayed and/or used, elements of data, functions, or other aspects of data/model to be edited, added, and/or manipulated, options for importation of and/or linking to application programmer interfaces (APIs), exterior services, data source, machine-learning models, and/or algorithms, or the like. A person of ordinary skill in the art, upon reviewing the entirety of this disclosure, will be aware of various ways in which a visual interface and/or elements thereof may be implemented and/or used as described in this disclosure.

Still referring to FIG. 1, in one or more embodiments, apparatus and methods described herein may involve one or more aspects of precise reconstructing of the left atrium (LA), pulmonary veins (PV), and left atrial appendage (LAA) in atrial fibrillation (AF) ablation. "Atrial fibrillation (AF)," as described herein, is a cardiac arrhythmia characterized by irregular and often rapid heart rate. In some cases, AF may lead to various complications, including, without limitation, stroke, heart failure, and/or the like. "AF ablation," as described herein, is a procedure that aims to isolate and eliminate the abnormal electrical pathways causing the cardiac arrhythmia. LA, PV, and LAA are key structures involved in AF. In an embodiment, precise 3D reconstruction of LA, PV, and LAA may help in understanding their geometry and relationships which are essential for planning and/or executing AF ablation. In some cases, LA, PV, and LAA may be mapped in order to enable clinicians to identify one or more specific sites responsible for AF, allowing targeted ablation that minimizes damages to surrounding tissues. Additionally, or alternatively, apparatus and methods described herein may reduce the risk of complications such as, without limitation, perforation, stenosis, collateral damage, among others to adjacent structures. Apparatus and methods described herein may ensure ablation energy is delivered to the intended locations.

Still referring to FIG. 1, in some embodiments, a computing device may determine a Left Atrial Appendage Occlusion Device placement as a function of the 3D model. In some embodiments, a computing device may determine a size of a Left Atrial Appendage Occlusion Device placement as a function of the 3D model. In some embodiments, a computing device may determine whether there is leakage resulting from Left Atrial Appendage Occlusion Device placement as a function of the 3D model. In some embodiments, a determined Left Atrial Appendage Occlusion Device size, placement, and/or leakage may be displayed to a user, such as by a display device.

Still referring to FIG. 1, in some embodiments, an apparatus and/or method described herein may allow ultrasonic imaging to replace and/or be an alternative to MRIs and/or CT scans. This may limit radiation exposure of subjects. Additionally, this may provide an option suitable for subjects with implants.

With continued reference to FIG. 1, it should be noted that apparatus 100 and methods described herein are not limited to medical or cardiac applications only. For example, and without limitation, visualization capabilities disclosed herein may be effectively adapted for use within other organs, such as liver, where precision and minimally invasive diagnostics are also crucial. A person of ordinary skill in the art, upon reviewing the entirety of this disclosure, will recognize one or more embodiments described herein and their underlaying principles may be readily transferrable to a broader spectrum of medical imaging and intervention applications such as, without limitation, transcatheter intervention (which is rapidly supplanting traditional open surgery), or other nonmedical contexts that are not currently disclosed.

Figure 2:
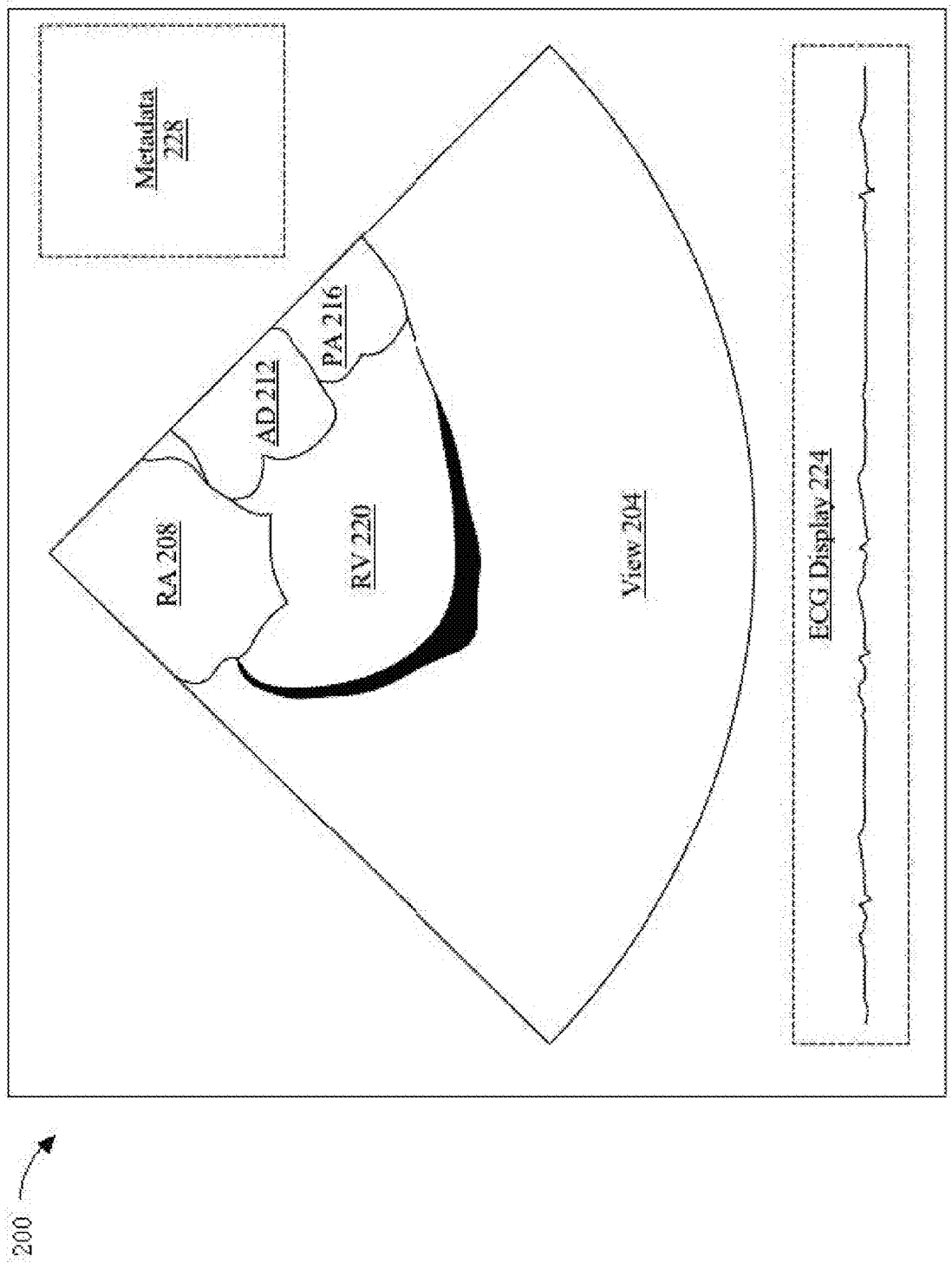
FIG. 2 shows an exemplary embodiment of an image for generating visualization within a 3D model.

Referring now to FIG. 2, an exemplary embodiment of an image 200 for generating visualization within 3D model 120 is illustrated. As described above, in one or more embodiments, image 200 may be a medical image, such as an ICE frame. In one or more embodiments, image 200 may be a real-time, dynamic ultrasound image that provides a view 204 of a structure's, such as a heart's, interior structures, including, without limitation, right atrium (RA) 208, anterior descending (AD) 212, pulmonary atresia (PA) 216, and right ventricular (RV) 220.

With continued reference to FIG. 2, in one or more embodiments, image 200 may include a grayscale image. It should be noted that, in one or more embodiments, image 200 may be configured to visualize blood flow and/or blood flow patterns within heart via color doppler. In one or more embodiments, resolution and/or clarity of image 200, such as ICE frame as described herein, may be superior to transthoracic or transesophageal echocardiography due to that ICE catheter may be positioned inside heart, closer to the structures being imaged.

With continued reference to FIG. 2, in a nonlimiting example, heart chambers may appear as dark, anechoic (black) areas since they are filled with blood, which doesn't reflect ultrasound waves well. Heart walls, valves, and/or other structures may appear as varying shades of gray, depending on their density and composition. In one or more embodiments, color doppler overlays may show blood flow in different colors, indicating the direction and speed of blood flow. For instance, and without limitation, red may indicate flow towards the probe, whereas blue may indicate flow away from the probe.

With continued reference to FIG. 2, in one or more embodiments, image 200 may be synchronized with ECG data as described above, allowing for precise timing of cardiac events with anatomical visualization provided by image 200 such as ICE frame. In one or more embodiments, ICE frame may include an ECG display 224 configured to display ECG waveform as a continuous line graph at the top, bottom, or side of the ICE frame. In one or more embodiments, specific parts of the cardiac cycle, e.g., systole or diastole, may be correlated and/or synchronized with visual data from image 200.

With continued reference to FIG. 2, additionally or alternatively, image 200 may be accompanied by metadata 228 displayed on the side or corners of image 200 as described herein. In one or more embodiments, metadata 228 may provide essential contextual information about image 200 and/or the corresponding patient. In a nonlimiting example, metadata 228 may include patient information (e.g., patient ID, name, DOB, age, gender, and the like), image acquisition details (e.g., date and time, probe type, frequency, depth, gain, and the like), procedure-related information (e.g., procedure name, operator, location, and the like), ECG trace (e.g., ECG data as described above), measurement annotations (e.g., any measurements taken directly on the image e.g., diameter, a value of thickness of a heart wall, and the like), image sequence information (e.g., image number, total number of frames, and the like), comments or notes, hospital or clinic information, and/or the like. A person of ordinary skill in the art, upon reviewing the entirety of this disclosure, will be aware of how image 200 and various components thereof may be incorporated within apparatus 100 to provide visualization within 3D model 120.

Figure 3A:
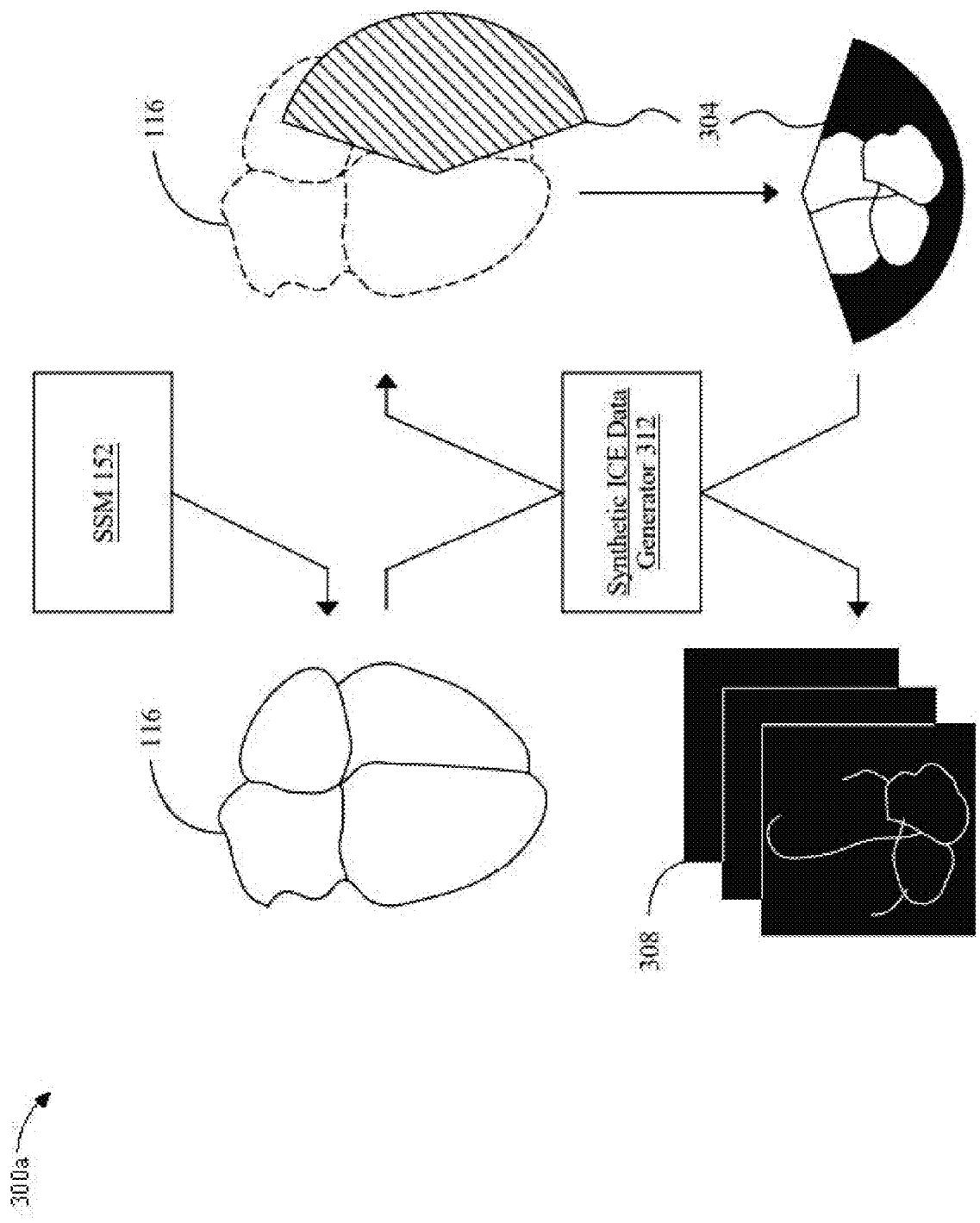
FIG. 3A is a flow diagram of an exemplary embodiment for a synthetic image generation process using intracardiac echo technology.

Referring now to FIG. 3A, a flow diagram 300a of an exemplary embodiment for a synthetic image generation process is illustrated. In one or more embodiments, processor 104 may be configured to receive a model 120 and identify at least a ROI 116 based on the received model 120. Field of view 140, which may include at least a point of view 144 and at least a view angle 148, may be determined to capture ROI 116. In one or more embodiments, model 120 received by processor 104 may be derived from CT scans or other similar images using SSM 136, as described above. Synthetic image 172, such as synthetic ICE frame 304, may then be generated, by processor 104, as a function of field of view 140. For the purposes of this disclosure, a "synthetic ICE frame" refers to a digitally generated or simulated image that emulates a visual representation obtained from field of view 140, as described above. In one or more embodiments, synthetic ICE frames 304 may be produced using computational methods and/or models such as, without limitation, an image generator 308 having one or more camera transformation program 176 and/or generative machine learning models based on pre-existing data, models, or simulations, e.g., model 120, as described above. In a nonlimiting example, synthetic ICE frames 304 may include a simplified version, e.g., an image illustrating heart anatomy via a plurality of lines indicating contours of heart's structure as shown in FIG. 3A. One or more image processing techniques and/or computer vision algorithms as described above, such as, without limitation, histogram equalization, adaptive filtering, edge detection (e.g., Canny or Sobel operators), contour extraction, and/or the like may be applied, by imaging processing module and/or computer vision module 132 as described above, at field of view 140. Synthetic ICE frame 304 may be rendered on a blank canvas or background that mimics the echogenicity of ICE frames according to extracted contours, wherein the extracted contours may be represented as bold lines and enhanced with shading to give depth. In one or more embodiments, synthetic ICE frame 304 may be validated and verified by overlaying synthetic ICE frame 304 onto field of view 140, ensuring accuracy and resemblance.

Figure 3B:
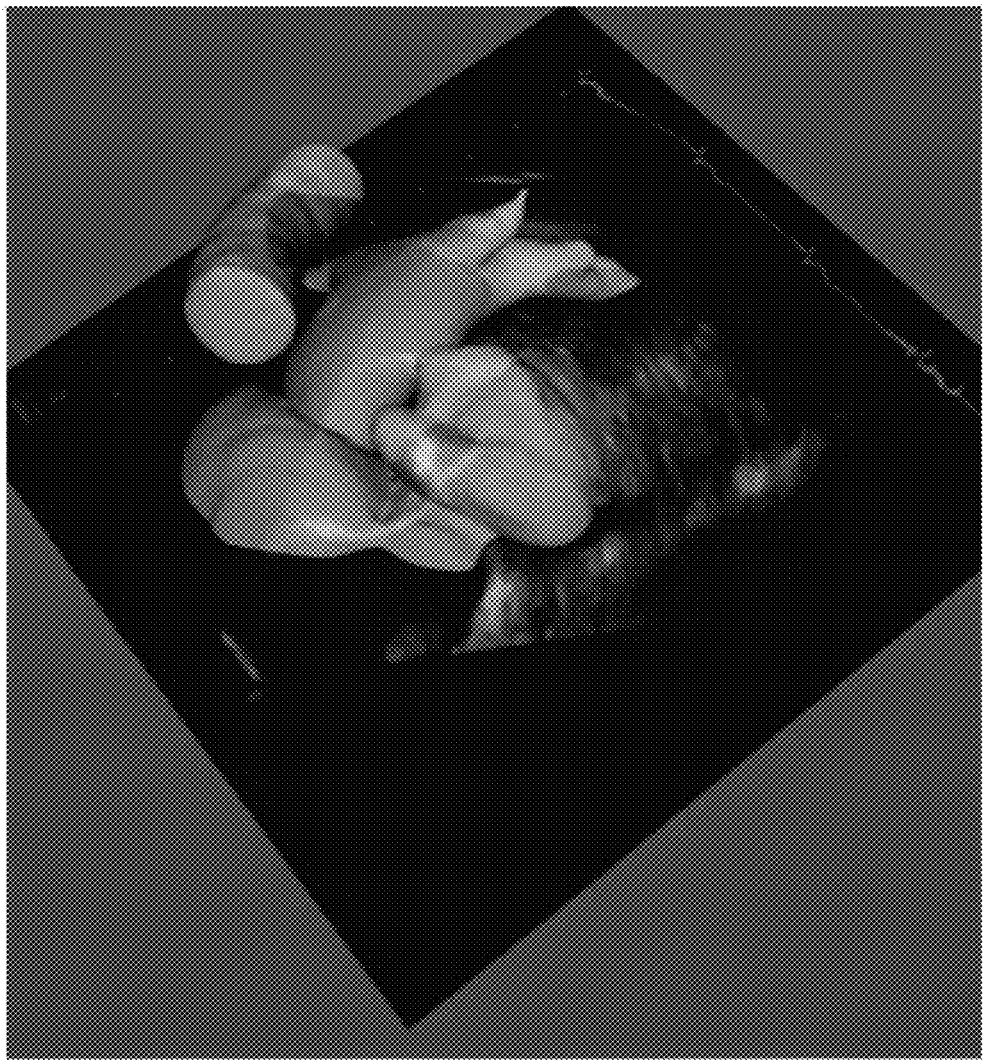
FIG. 3B is an exemplary embodiment of a two-dimensional (2D) cross section overlaid within at least a portion of a 3D model, wherein the 2D cross section contains an estimated region of interest of a query image.

Referring now to FIG. 3B, an exemplary embodiment 300b of 2D cross section 192 overlaid within at least a portion of 3D model 120 is illustrated, wherein the 2D cross section 192 contains estimated ROI 188 of query image 112. In one or more embodiments, estimated ROI 188 may adapt to at least a change in input in real time. As a nonlimiting example, change in input may be a change in position of image capture device (e.g., ICE catheter) during a procedure that results in a change in query medical image 172. As another nonlimiting example, change in input may be a fluctuation of cardiac anatomy over time (e.g., a cardiac cycle or heartbeat) that results in a change in query medical image 172. As a nonlimiting example, estimated ROI 188 may contain one or more rotatable views that may aid medical professionals in positioning image capture device, such as ICE catheter, during medical procedures such as an atrial fibrillation ablation procedure. In one or more embodiments, processor 104 may be further configured to evaluate the certainty in estimated ROI 188; if the certainty falls below a certain threshold, processor may be configured to receive at least a supplemental query image, and iteratively update the estimated ROI 188 as a function of the at least a supplemental query image, until a desired certainty is reached. In a nonlimiting example, receiving at least a supplemental query image and/or updating estimated ROI 188 described herein may be consistent with any detail disclosed in U.S. patent application Ser. No. 18/426,604, filed on Jan. 30, 2024, and entitled "APPARATUS AND METHOD FOR GENERATING A THREE-DIMENSIONAL (3D) MODEL OF CARDIAC ANATOMY BASED ON MODEL UNCERTAINTY", the entirety of which is incorporated herein by reference.

Figure 4:
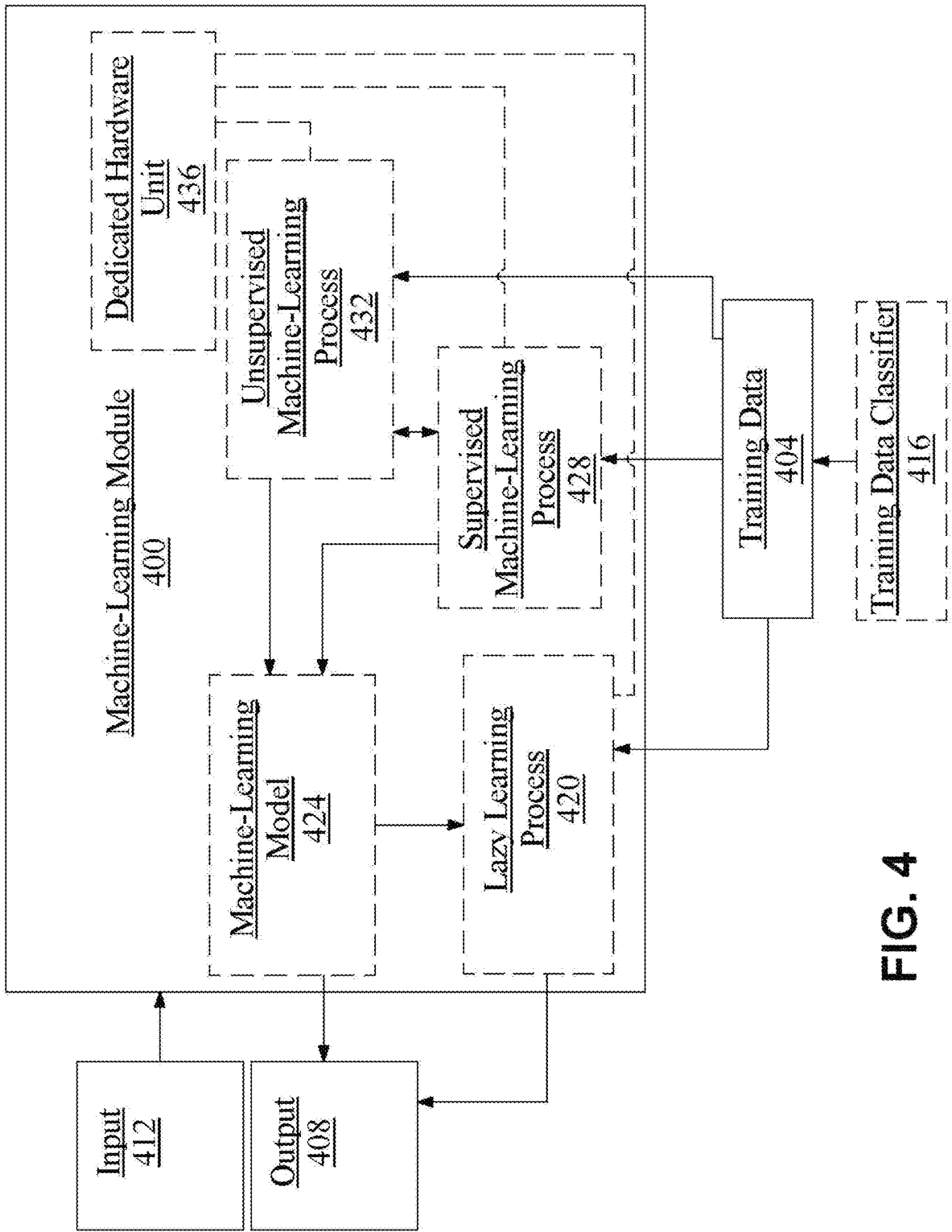
FIG. 4 is a block diagram of an exemplary machine learning process.

Referring now to FIG. 4, an exemplary embodiment of a machine learning module 400 that may perform one or more machine learning processes as described above is illustrated. Machine learning module may perform determinations, classification, and/or analysis steps, methods, processes, or the like as described in this disclosure using machine learning processes. For the purposes of this disclosure, a "machine learning process" is an automated process that uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are pre-determined by user and written in a programming language.

With continued reference to FIG. 4, "training data", for the purposes of this disclosure, are data containing correlations that a machine learning process may use to model relationships between two or more categories of data elements. For instance, and without limitation, training data 404 may include a plurality of data entries, also known as "training examples", each entry representing a set of data elements that were recorded, received, and/or generated together. Data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine learning processes as described in further detail below. Training data 404 may be formatted and/or organized by categories of data elements, for instance by associating data elements with one or more descriptors corresponding to categories of data elements. As a nonlimiting example, training data 404 may include data entered in standardized forms by persons or processes, such that entry of a given data element within a given field in a given form may be mapped to one or more descriptors of categories. Elements in training data 404 may be linked to descriptors of categories by tags, tokens, or other data elements. For instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

With continued reference to FIG. 4, alternatively or additionally, training data 404 may include one or more elements that are uncategorized; that is, training data 404 may not be formatted or contain descriptors for some elements of data. Machine learning algorithms and/or other processes may sort training data 404 according to one or more categorizations using, for instance, natural language processing algorithms, tokenization, detection of correlated values in raw data, and the like; categories may be generated using correlation and/or other processing algorithms. As a nonlimiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine learning algorithms, and/or automated association of data in the data entry with descriptors or into a given format. The ability to categorize data entries automatedly may enable the same training data 404 to be made applicable for two or more distinct machine learning algorithms as described in further detail below. Training data 404 used by machine learning module 400 may correlate any input data as described in this disclosure to any output data as described in this disclosure. As a nonlimiting illustrative example, inputs may include inputs such as model 120, heart images from patient profile 124, and the like, and outputs may include outputs such as synthetic image 172.

With continued reference to FIG. 4, training data 404 may be filtered, sorted, and/or selected using one or more supervised and/or unsupervised machine learning processes and/or models as described in further detail below; such processes and/or models may include without limitation a training data classifier 416. For the purposes of this disclosure, a "classifier" is a machine learning model, such as a data structure representing and/or using a mathematical model, neural net, or a program generated by a machine learning algorithm, known as a "classification algorithm", that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine learning module 400 may generate a classifier using a classification algorithm. For the purposes of this disclosure, a "classification algorithm" is a process wherein a computing device and/or any module and/or component operating therein derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, Fisher's linear discriminant, quadratic classifiers, decision trees, boosted trees, random forest classifiers, learning vector quantization, and/or neural network-based classifiers. In one or more embodiments, training data classifier 416 may classify elements of training data to geographic locations, occupations, industries, and/or the like. In one or more embodiments, each geographic location may contain its own regulations and/or ordinances. In one or more embodiments, each business specialty may contain its own requirements.

With continued reference to FIG. 4, machine learning module 400 may be configured to generate a classifier using a naive Bayes classification algorithm. Naive Bayes classification algorithm generates classifiers by assigning class labels to problem instances, represented as vectors of element values. Class labels are drawn from a finite set. Naive Bayes classification algorithm may include generating a family of algorithms that assume that the value of a particular element is independent of the value of any other element, given a class variable. Naive Bayes classification algorithm may be based on Bayes Theorem expressed as P(A/B)=P(B/A)×P(A)÷P(B), where P(A/B) is the probability of hypothesis A given data B, also known as posterior probability; P(B/A) is the probability of data B given that the hypothesis A was true; P(A) is the probability of hypothesis A being true regardless of data, also known as prior probability of A; and P(B) is the probability of the data regardless of the hypothesis. A naive Bayes algorithm may be generated by first transforming training data into a frequency table. Machine learning module 400 may then calculate a likelihood table by calculating probabilities of different data entries and classification labels. Machine learning module 400 may utilize a naive Bayes equation to calculate a posterior probability for each class. A class containing the highest posterior probability is the outcome of prediction. Naive Bayes classification algorithm may include a gaussian model that follows a normal distribution. Naive Bayes classification algorithm may include a multinomial model that is used for discrete counts. Naive Bayes classification algorithm may include a Bernoulli model that may be utilized when vectors are binary.

With continued reference to FIG. 4, machine learning module 400 may be configured to generate a classifier using a k-nearest neighbors (KNN) algorithm. For the purposes of this disclosure, a "k-nearest neighbors algorithm" is or at least includes a classification method that utilizes feature similarity to analyze how closely out-of-sample features resemble training data 404 and to classify input data to one or more clusters and/or categories of features as represented in training data 404; this may be performed by representing both training data 404 and input data in vector forms and using one or more measures of vector similarity to identify classifications within training data 404 and determine a classification of input data. K-nearest neighbors algorithm may include specifying a k-value, or a number directing the classifier to select the k most similar entries of training data 404 to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a nonlimiting example, an initial heuristic may include a ranking of associations between inputs 412 and elements of training data 404. Heuristic may include selecting some number of highest-ranking associations and/or training data elements.

With continued reference to FIG. 4, generating k-nearest neighbors algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least 2. Each value of n-tuple of values may represent a measurement or other quantitative value associated with a given category of data or attribute, examples of which are provided in further detail below. A vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent when their directions and/or relative quantities of values are the same; thus, as a nonlimiting example, a vector represented as [5, 10, 15] may be treated as equivalent, for the purposes of this disclosure, as a vector represented as [1, 2, 3]. Vectors may be more similar where their directions are more similar, and more different where their directions are more divergent. However, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized", or divided by a "length" attribute, such as a length attribute l as derived using a Pythagorean norm:

$$l = \sqrt{\sum_{i=0}^{n} a_i^2},$$

where $a_i$ is attribute number of vector i. Scaling and/or normalization may function to make vector comparison independent of absolute quantities of attributes, while preserving any dependency on similarity of attributes. This may, for instance, be advantageous where cases represented in training data 404 are represented by different quantities of samples, which may result in proportionally equivalent vectors with divergent values.

With continued reference to FIG. 4, training examples for use as training data may be selected from a population of potential examples according to cohorts relevant to an analytical problem to be solved, a classification task, or the like. Alternatively or additionally, training data 404 may be selected to span a set of likely circumstances or inputs for a machine learning model and/or process to encounter when deployed. For instance, and without limitation, for each category of input data to a machine learning model and/or process that may exist in a range of values in a population of phenomena such as images, user data, process data, physical data, or the like, a computing device, processor 104, and/or machine learning module 400 may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to user, so that a process can detect, automatically or via user input, one or more values that are not included in the set of training examples. Computing device, processor 104, and/or machine learning module 400 may automatically generate a missing training example. This may be done by receiving and/or retrieving a missing input and/or output value and correlating the missing input and/or output value with a corresponding output and/or input value collocated in a data record with the retrieved value, provided by user, another device, or the like.

With continued reference to FIG. 4, computing device, processor 104, and/or machine learning module 400 may be configured to preprocess training data 404. For the purposes of this disclosure, "preprocessing" training data is a process that transforms training data from a raw form to a format that can be used for training a machine learning model. Preprocessing may include sanitizing, feature selection, feature scaling, data augmentation and the like.

With continued reference to FIG. 4, computing device, processor 104, and/or machine learning module 400 may be configured to sanitize training data. For the purposes of this disclosure, "sanitizing" training data is a process whereby training examples that interfere with convergence of a machine learning model and/or process are removed to yield a useful result. For instance, and without limitation, a training example may include an input and/or output value that is an outlier from typically encountered values, such that a machine learning algorithm using the training example will be skewed to an unlikely range of input 412 and/or output 408; a value that is more than a threshold number of standard deviations away from an average, mean, or expected value, for instance, may be eliminated. Alternatively or additionally, one or more training examples may be identified as having poor-quality data, where "poor-quality" means having a signal-to-noise ratio below a threshold value. In one or more embodiments, sanitizing training data may include steps such as removing duplicative or otherwise redundant data, interpolating missing data, correcting data errors, standardizing data, identifying outliers, and/or the like. In one or more embodiments, sanitizing training data may include algorithms that identify duplicate entries or spell-check algorithms.

With continued reference to FIG. 4, in one or more embodiments, images used to train an image classifier or other machine learning model and/or process that takes images as inputs 412 or generates images as outputs 408 may be rejected if image quality is below a threshold value. For instance, and without limitation, computing device, processor 104, and/or machine learning module 400 may perform blur detection. Elimination of one or more blurs may be performed, as a nonlimiting example, by taking Fourier transform or a Fast Fourier Transform (FFT) of image and analyzing a distribution of low and high frequencies in the resulting frequency-domain depiction of the image. Numbers of high-frequency values below a threshold level may indicate blurriness. As a further nonlimiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of image, based on the hypothesis that rapid changes indicate sharp edges in the image, and thus are indicative of a lower degree of blurriness. Blur detection may be performed using a wavelet-based operator, which uses coefficients of a discrete wavelet transform to describe the frequency and spatial content of images. Blur detection may be performed using statistics-based operators that take advantage of several image statistics as texture descriptors in order to compute a focus level. Blur detection may be performed by using discrete cosine transform (DCT) coefficients in order to compute a focus level of an image from its frequency content.

With continued reference to FIG. 4, computing device, processor 104, and/or machine learning module 400 may be configured to precondition one or more training examples. For instance, and without limitation, where a machine learning model and/or process has one or more inputs 412 and/or outputs 408 requiring, transmitting, or receiving a certain number of bits, samples, or other units of data, one or more elements of training examples to be used as or compared to inputs 412 and/or outputs 408 may be modified to have such a number of units of data. In one or more embodiments, computing device, processor 104, and/or machine learning module 400 may convert a smaller number of units, such as in a low pixel count image, into a desired number of units by upsampling and interpolating. As a nonlimiting example, a low pixel count image may have 100 pixels, whereas a desired number of pixels may be 132. Processor 104 may interpolate the low pixel count image to convert 100 pixels into 132 pixels. It should also be noted that one of ordinary skill in the art, upon reading the entirety of this disclosure, would recognize the various methods to interpolate a smaller number of data units such as samples, pixels, bits, or the like to a desired number of such units. In one or more embodiments, a set of interpolation rules may be trained by sets of highly detailed inputs 412 and/or outputs 408 and corresponding inputs 412 and/or outputs 408 downsampled to smaller numbers of units, and a neural network or another machine learning model that is trained to predict interpolated pixel values using the training data 404. As a nonlimiting example, a sample input 412 and/or output 408, such as a sample picture, with sample-expanded data units (e.g., pixels added between the original pixels) may be input to a neural network or machine learning model and output a pseudo replica sample picture with dummy values assigned to pixels between the original pixels based on a set of interpolation rules. As a nonlimiting example, in the context of an image classifier, a machine learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, computing device, processor 104, and/or machine learning module 400 may utilize sample expander methods, a low-pass filter, or both. For the purposes of this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor 104, and/or machine learning module 400 may use averaging, such as luma or chroma averaging in images, to fill in data units in between original data units.

With continued reference to FIG. 4, in one or more embodiments, computing device, processor 104, and/or machine learning module 400 may downsample elements of a training example to a desired lower number of data elements. As a nonlimiting example, a high pixel count image may contain 256 pixels, however a desired number of pixels may be 132. Processor 104 may downsample the high pixel count image to convert 256 pixels into 132 pixels. In some embodiments, processor 104 may be configured to perform downsampling on data.

Downsampling, also known as decimation, may include removing every $N^{th}$ entry in a sequence of samples, all but every $N^{th}$ entry, or the like, which is a process known as "compression" and may be performed, for instance by an N-sample compressor implemented using hardware or software. Anti-aliasing and/or anti-imaging filters, and/or low-pass filters, may be used to eliminate side effects of compression.

With continued reference to FIG. 4, feature selection may include narrowing and/or filtering training data 404 to exclude features and/or elements, or training data including such elements that are not relevant to a purpose for which a trained machine learning model and/or algorithm is being trained, and/or collection of features, elements, or training data including such elements based on relevance to or utility for an intended task or purpose for which a machine learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, wherein a difference between each value, X, and a minimum value, $X_{min}$, in a set or subset of values is divided by a range of values, $X_{max} - X_{min}$, in the set or subset:

$$X_{new} = \frac{X - X_{min}}{X_{max} - X_{min}}.$$

Feature scaling may include mean normalization, wherein a difference between each value, X, and a mean value of a set and/or subset of values, $X_{mean}$, is divided by a range of values, $X_{max} - X_{min}$, in the set or subset:

$$X_{new} = \frac{X - X_{mean}}{X_{max} - X_{min}}.$$

Feature scaling may include standardization, wherein a difference between X and $X_{mean}$ is divided by a standard deviation, $\sigma$, of a set or subset of values:

$$X_{new} = \frac{X - X_{mean}}{\sigma}.$$

Feature scaling may be performed using a median value of a set or subset, $X_{median}$, and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

A Person of ordinary skill in the art, upon reviewing the entirety of this disclosure, will be aware of various alternative or additional approaches that may be used for feature scaling.

With continued reference to FIG. 4, computing device, processor 104, and/or machine learning module 400 may be configured to perform one or more processes of data augmentation. For the purposes of this disclosure, "data augmentation" is a process that adds data to a training data 404 using elements and/or entries already in the dataset. Data augmentation may be accomplished, without limitation, using interpolation, generation of modified copies of existing entries and/or examples, and/or one or more generative artificial intelligence (AI) processes, for instance using deep neural networks and/or generative adversarial networks. Generative processes may be referred to alternatively in this context as "data synthesis" and as creating "synthetic data". Augmentation may include performing one or more transformations on data, such as geometric, color space, affine, brightness, cropping, and/or contrast transformations of images.

With continued reference to FIG. 4, machine learning module 400 may be configured to perform a lazy learning process and/or protocol 420. For the purposes of this disclosure, a "lazy learning" process and/or protocol is a process whereby machine learning is conducted upon receipt of input 412 to be converted to output 408 by combining the input 412 and training data 404 to derive the algorithm to be used to produce the output 408 on demand. A lazy learning process may alternatively be referred to as a "lazy loading" or "call-when-needed" process and/or protocol. For instance, an initial set of simulations may be performed to cover an initial heuristic and/or "first guess" at an output 408 and/or relationship. As a nonlimiting example, an initial heuristic may include a ranking of associations between inputs 412 and elements of training data 404. Heuristic may include selecting some number of highest-ranking associations and/or training data 404 elements. Lazy learning may implement any suitable lazy learning algorithm, including without limitation a k-nearest neighbors algorithm, a lazy naive Bayes algorithm, or the like. A person of ordinary skill in the art, upon reviewing the entirety of this disclosure, will be aware of various lazy learning algorithms that may be applied to generate outputs as described in this disclosure, including without limitation lazy learning applications of machine learning algorithms as described in further detail below.

With continued reference to FIG. 4, alternatively or additionally, machine learning processes as described in this disclosure may be used to generate machine learning models 424. A "machine learning model", for the purposes of this disclosure, is a data structure representing and/or instantiating a mathematical and/or algorithmic representation of a relationship between inputs 412 and outputs 408, generated using any machine learning process including without limitation any process described above, and stored in memory. An input 412 is submitted to a machine learning model 424 once created, which generates an output 408 based on the relationship that was derived. For instance, and without limitation, a linear regression model, generated using a linear regression algorithm, may compute a linear combination of input data using coefficients derived during machine learning processes to calculate an output datum. As a further nonlimiting example, a machine learning model 424 may be generated by creating an artificial neural network, such as a convolutional neural network comprising an input layer of nodes, one or more intermediate layers, and an output layer of nodes. Connections between nodes may be created by "training" the network, in which elements from a training data 404 are applied to the input nodes, and a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning, as described in detail below.

With continued reference to FIG. 4, machine learning module 400 may perform at least a supervised machine learning process 428. For the purposes of this disclosure, a "supervised" machine learning process is a process with algorithms that receive training data 404 relating one or more inputs 412 to one or more outputs 408, and seek to generate one or more data structures representing and/or instantiating one or more mathematical relations relating input 412 to output 408, where each of the one or more mathematical relations is optimal according to some criterion specified to the algorithm using some scoring function. For instance, a supervised learning algorithm may include models 120 described above as inputs, synthetic images 172 described above as outputs, and a scoring function representing a desired form of relationship to be detected between inputs 412 and outputs 408. Scoring function may, for instance, seek to maximize the probability that a given input 412 and/or combination thereof is associated with a given output 408 to minimize the probability that a given input 412 is not associated with a given output 408. Scoring function may be expressed as a risk function representing an "expected loss" of an algorithm relating inputs 412 to outputs 408, where loss is computed as an error function representing a degree to which a prediction generated by the relation is incorrect when compared to a given input-output pair provided in training data 404. Supervised machine learning processes may include classification algorithms as defined above. A person of ordinary skill in the art, upon reviewing the entirety of this disclosure, will be aware of various possible variations of at least a supervised machine learning process 428 that may be used to determine a relation between inputs and outputs.

With continued reference to FIG. 4, training a supervised machine learning process may include, without limitation, iteratively updating coefficients, biases, and weights based on an error function, expected loss, and/or risk function. For instance, an output 408 generated by a supervised machine learning model 428 using an input example in a training example may be compared to an output example from the training example; an error function may be generated based on the comparison, which may include any error function suitable for use with any machine learning algorithm described in this disclosure, including a square of a difference between one or more sets of compared values or the like. Such an error function may be used in turn to update one or more weights, biases, coefficients, or other parameters of a machine learning model through any suitable process including without limitation gradient descent processes, least-squares processes, and/or other processes described in this disclosure. This may be done iteratively and/or recursively to gradually tune such weights, biases, coefficients, or other parameters. Updates may be performed in neural networks using one or more back-propagation algorithms. Iterative and/or recursive updates to weights, biases, coefficients, or other parameters as described above may be performed until currently available training data 404 are exhausted and/or until a convergence test is passed. For the purposes of this disclosure, a "convergence test" is a test for a condition selected to indicate that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

With continued reference to FIG. 4, a computing device, processor 104, and/or machine learning module 400 may be configured to perform method, method step, sequence of method steps, and/or algorithm described in reference to this figure, in any order and with any degree of repetition. For instance, computing device, processor 104, and/or machine learning module 400 may be configured to perform a single step, sequence, and/or algorithm repeatedly until a desired or commanded outcome is achieved; repetition of a step or a sequence of steps may be performed iteratively and/or recursively using outputs 408 of previous repetitions as inputs 412 to subsequent repetitions, aggregating inputs 412 and/or outputs 408 of repetitions to produce an aggregate result, reduction or decrement of one or more variables such as global variables, and/or division of a larger processing task into a set of iteratively addressed smaller processing tasks. Computing device, processor 104, and/or machine learning module 400 may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. A person of ordinary skill in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 4, machine learning process may include at least an unsupervised machine learning process 432. For the purposes of this disclosure, an unsupervised machine learning process is a process that derives inferences in datasets without regard to labels. As a result, an unsupervised machine learning process 432 may be free to discover any structure, relationship, and/or correlation provided in the data. Unsupervised processes 432 may not require a response variable, may be used to find interesting patterns and/or inferences between variables, to determine a degree of correlation between two or more variables, or the like.

With continued reference to FIG. 4, machine learning module 400 may be designed and configured to create machine learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include an elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to a person of ordinary skill in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought. Similar methods to those described above may be applied to minimize error functions, as will be apparent to a person of ordinary skill in the art upon reviewing the entirety of this disclosure.

With continued reference to FIG. 4, machine learning algorithms may include, without limitation, linear discriminant analysis. Machine learning algorithm may include quadratic discriminant analysis. Machine learning algorithms may include kernel ridge regression. Machine learning algorithms may include support vector machines, including without limitation support vector classification-based regression processes. Machine learning algorithms may include stochastic gradient descent algorithms, including classification and regression algorithms based on stochastic gradient descent. Machine learning algorithms may include nearest neighbors algorithms. Machine learning algorithms may include various forms of latent space regularization such as variational regularization. Machine learning algorithms may include Gaussian processes such as Gaussian Process Regression. Machine learning algorithms may include cross-decomposition algorithms, including partial least squares and/or canonical correlation analysis. Machine learning algorithms may include naive Bayes methods. Machine learning algorithms may include algorithms based on decision trees, such as decision tree classification or regression algorithms. Machine learning algorithms may include ensemble methods such as bagging meta-estimator, forest of randomized trees, AdaBoost, gradient tree boosting, and/or voting classifier methods. Machine learning algorithms may include neural net algorithms, including convolutional neural net processes.

With continued reference to FIG. 4, a machine learning model and/or process may be deployed or instantiated by incorporation into a program, apparatus, system, and/or module. For instance, and without limitation, a machine learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit, to represent a number according to any suitable encoding system including twos complement or the like, or may be stored in any volatile and/or non-volatile memory. Similarly, mathematical operations and input 412 and/or output 408 of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine learning process and/or model, including without limitation any combination of production and/or configuration of non-reconfigurable hardware elements, circuits, and/or modules such as without limitation application-specific integrated circuits (ASICs), production and/or configuration of reconfigurable hardware elements, circuits, and/or modules such as without limitation field programmable gate arrays (FPGAs), production and/or configuration of non-reconfigurable and/or non-rewritable memory elements, circuits, and/or modules such as without limitation non-rewritable read-only memory (ROM), other memory technology described in this disclosure, and/or production and/or configuration of any computing device and/or component thereof as described in this disclosure. Such deployed and/or instantiated machine learning model and/or algorithm may receive inputs 412 from any other process, module, and/or component described in this disclosure, and produce outputs 408 to any other process, module, and/or component described in this disclosure.

With continued reference to FIG. 4, any process of training, retraining, deployment, and/or instantiation of any machine learning model and/or algorithm may be performed and/or repeated after an initial deployment and/or instantiation to correct, refine, and/or improve the machine learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs 408 of machine learning models and/or algorithms, and/or errors and/or error functions thereof, to any thresholds, convergence tests, or the like, and/or may compare outputs 408 of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 4, retraining and/or additional training may be performed using any process for training described above, using any currently or previously deployed version of a machine learning model and/or algorithm as a starting point. Training data for retraining may be collected, preconditioned, sorted, classified, sanitized, or otherwise processed according to any process described in this disclosure. Training data 404 may include, without limitation, training examples including inputs 412 and correlated outputs 408 used, received, and/or generated from any version of any system, module, machine learning model or algorithm, apparatus, and/or method described in this disclosure. Such examples may be modified and/or labeled according to user feedback or other processes to indicate desired results, and/or may have actual or measured results from a process being modeled and/or predicted by system, module, machine learning model or algorithm, apparatus, and/or method as "desired" results to be compared to outputs 408 for training processes as described above. Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

With continued reference to FIG. 4, one or more processes or algorithms described above may be performed by at least a dedicated hardware unit 436. For the purposes of this disclosure, a "dedicated hardware unit" is a hardware component, circuit, or the like, aside from a principal control circuit and/or processor performing method steps as described in this disclosure, that is specifically designated or selected to perform one or more specific tasks and/or processes described in reference to this figure, such as without limitation preprocessing and/or sanitization of training data and/or training a machine learning algorithm and/or model. Dedicated hardware unit 436 may include, without limitation, a hardware unit that can perform iterative or massed calculations, such as matrix-based calculations to update or tune parameters, weights, coefficients, and/or biases of machine learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously, in parallel, and/or the like. Such dedicated hardware units 436 may include, without limitation, graphical processing units (GPUs), dedicated signal processing modules, field programmable gate arrays (FPGA), other reconfigurable hardware that has been configured to instantiate parallel processing units for one or more specific tasks, or the like, Computing device, processor 104, apparatus 100, or machine learning module 400 may be configured to instruct one or more dedicated hardware units 436 to perform one or more operations described herein, such as evaluation of model and/or algorithm outputs, onetime or iterative updates to parameters, coefficients, weights, and/or biases, vector and/or matrix operations, and/or any other operations described in this disclosure.

Figure 5:
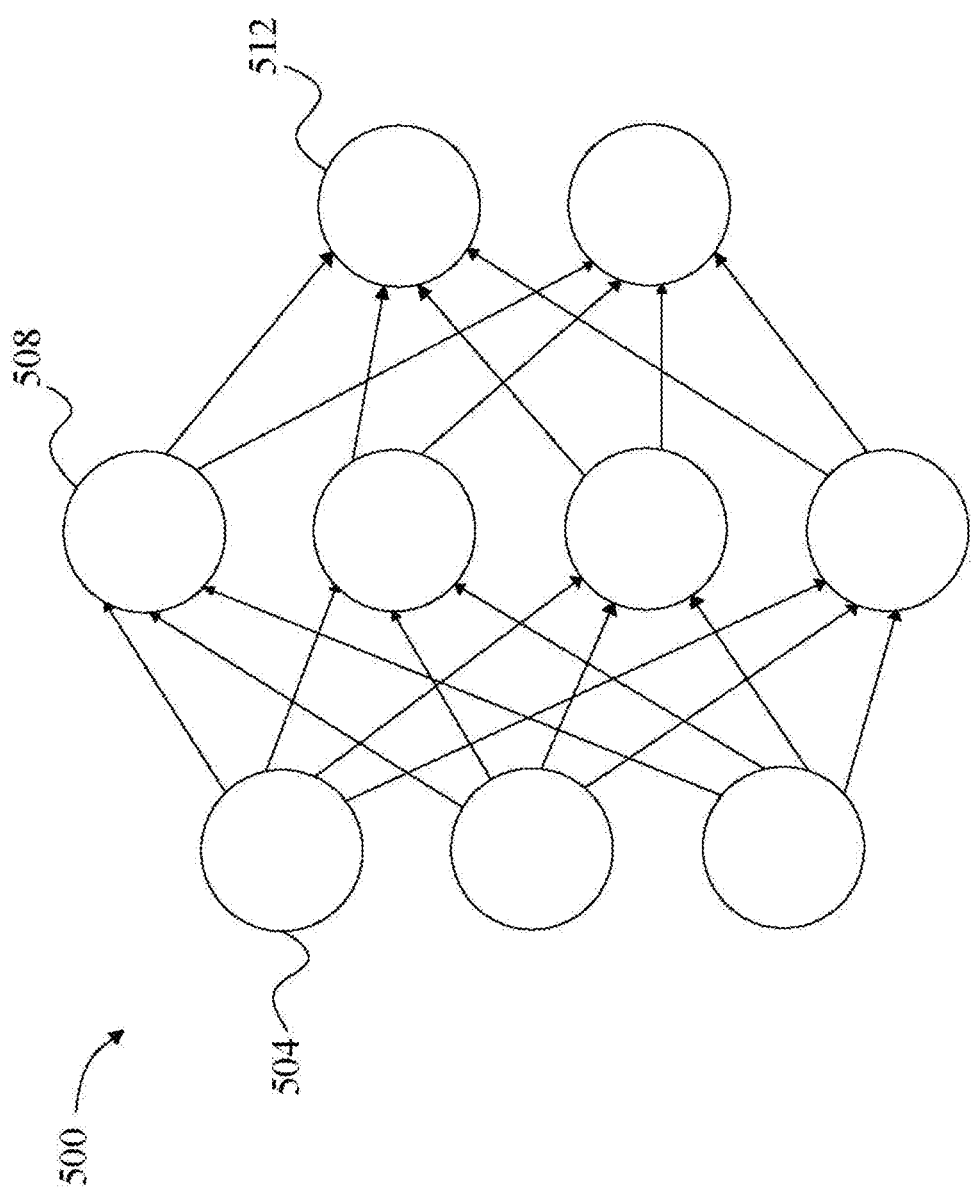
FIG. 5 is a diagram of an exemplary embodiment of a neural network.

Referring now to FIG. 5, an exemplary embodiment of neural network 500 is illustrated. For the purposes of this disclosure, a neural network or artificial neural network is a network of "nodes" or data structures having one or more inputs, one or more outputs, and a function determining outputs based on inputs. Such nodes may be organized in a network, such as without limitation a convolutional neural network, including an input layer of nodes 504, at least an intermediate layer of nodes 508, and an output layer of nodes 512. Connections between nodes may be created via the process of "training" neural network 500, in which elements from a training dataset are applied to the input nodes, and a suitable training algorithm (such as Levenberg-Marquardt, conjugate gradient, simulated annealing, or other algorithms) is then used to adjust the connections and weights between nodes in adjacent layers of the neural network 500 to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network". As a further nonlimiting example, neural network 500 may include a convolutional neural network comprising an input layer of nodes 504, one or more intermediate layers of nodes 508, and an output layer of nodes 512. For the purposes of this disclosure, a "convolutional neural network" is a type of neural network 500 in which at least one hidden layer is a convolutional layer that convolves inputs to that layer with a subset of inputs known as a "kernel", along with one or more additional layers such as pooling layers, fully connected layers, and the like.

Figure 6:
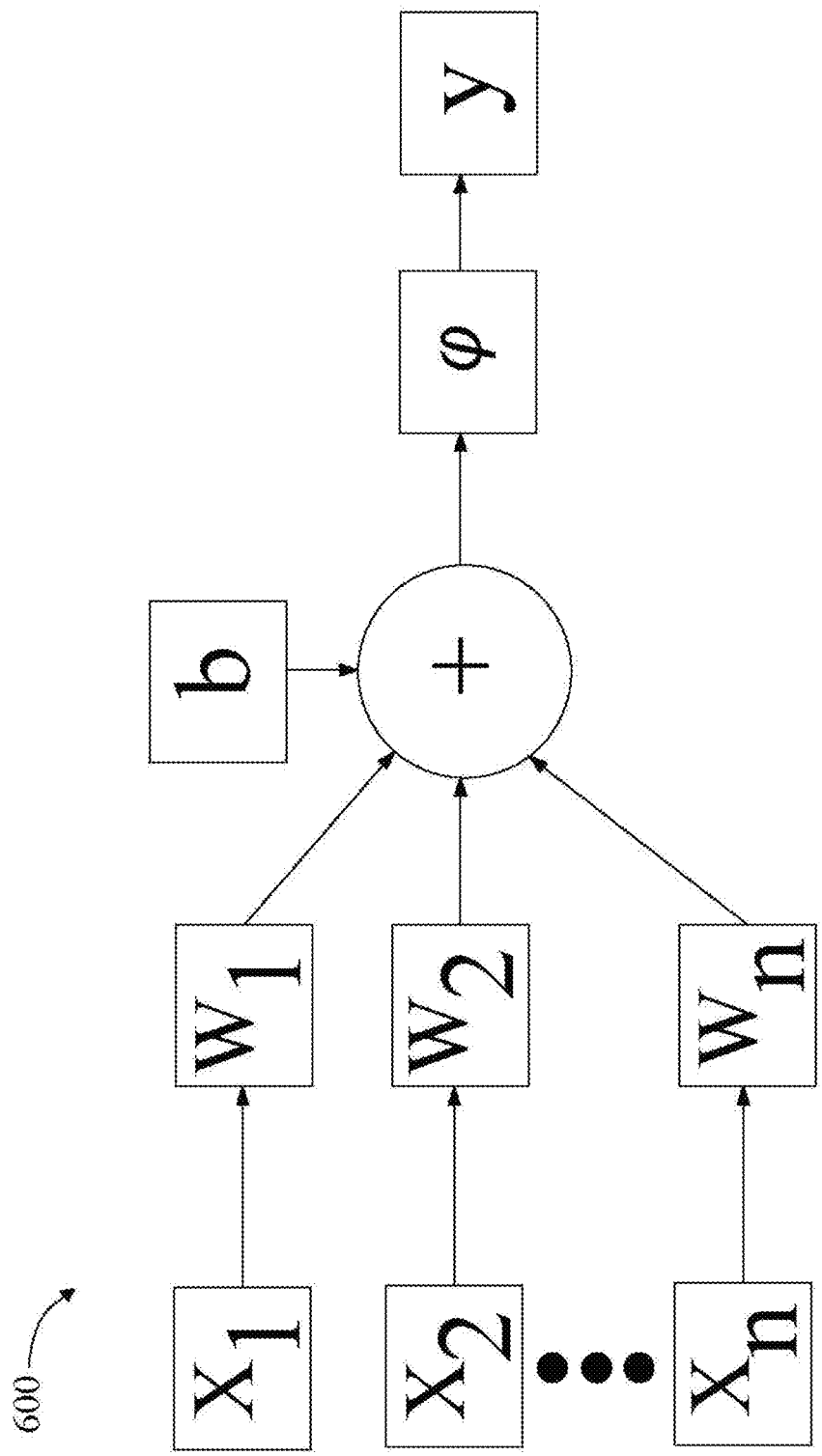
FIG. 6 is a diagram of an exemplary embodiment of a node of a neural network.

Referring now to FIG. 6, an exemplary embodiment of a node 600 of neural network 500 is illustrated. Node 600 may include, without limitation, a plurality of inputs, $x_i$, that may receive numerical values from inputs to neural network 500 containing the node 600 and/or from other nodes 600. Node 600 may perform one or more activation functions to produce its output given one or more inputs, such as without limitation computing a binary step function comparing an input to a threshold value and outputting either a logic 1 or logic 0 output or its equivalent, a linear activation function whereby an output is directly proportional to input, and/or a nonlinear activation function wherein the output is not proportional to the input. Nonlinear activation functions may include, without limitation, a sigmoid function of the form $$f(x) = \frac{1}{1-e^{-x}}$$

given input x, a tanh (hyberbolic tangent) function of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some value of $\alpha$, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$, that may be used as activation functions. As a nonlimiting and illustrative example, node 600 may perform a weighted sum of inputs using weights, $w_i$, that are multiplied by respective inputs, $x_i$. Additionally or alternatively, a bias b may be added to the weighted sum of the inputs such that an offset is added to each unit in a neural network layer that is independent of the input to the layer. The weighted sum may then be input into a function, φ, which may generate one or more outputs, y. Weight, $w_i$, applied to an input, $x_i$, may indicate whether the input is "excitatory", indicating that it has strong influence on the one or more outputs, y, for instance by the corresponding weight having a large numerical value, or "inhibitory", indicating it has a weak influence on the one more outputs, y, for instance by the corresponding weight having a small numerical value. The values of weights, $w_i$, may be determined by training neural network 500 using training data, which may be performed using any suitable process as described above.

Figure 7:
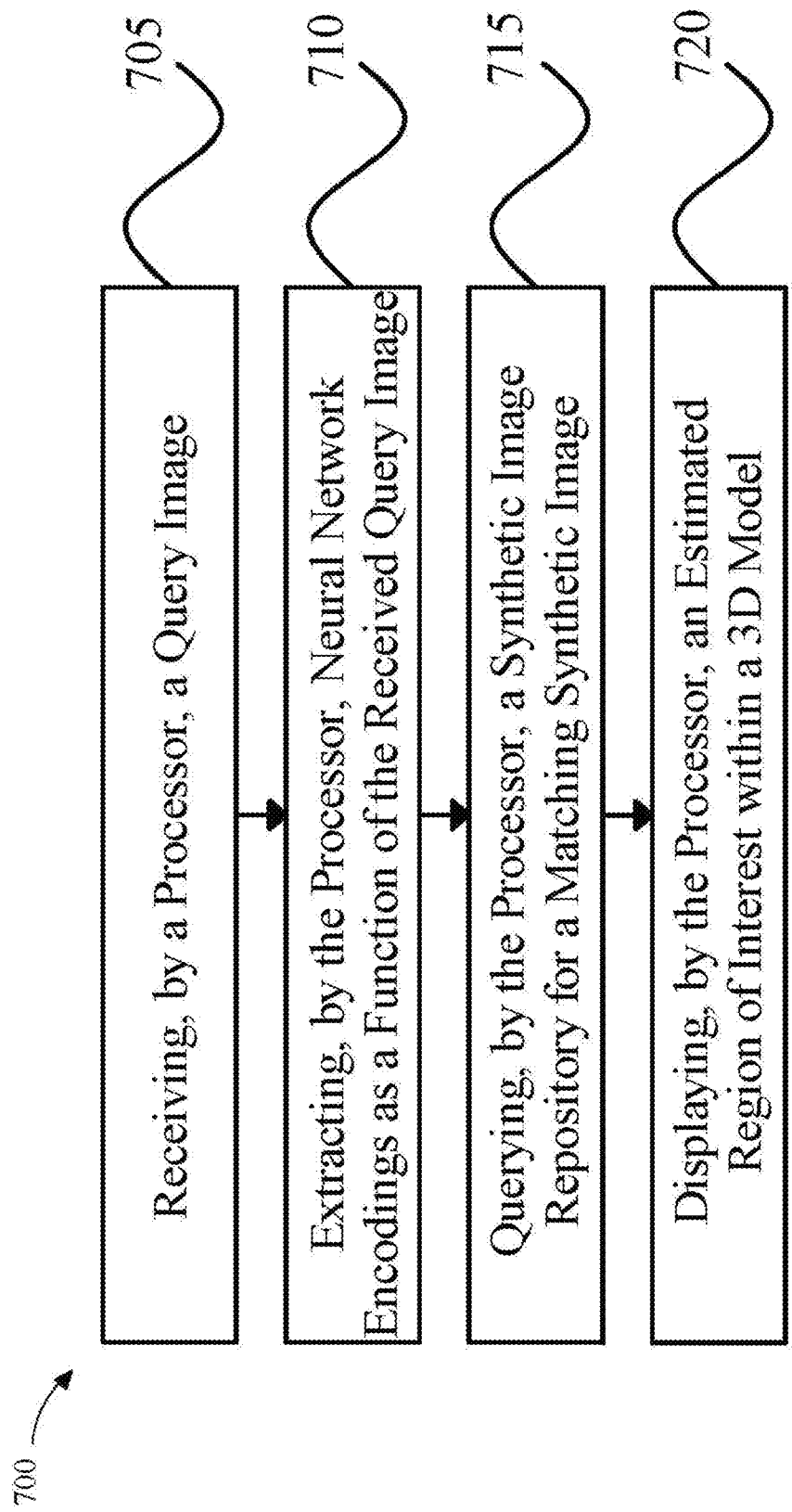
FIG. 7 is an exemplary flow diagram illustrating a method that provides visualization within a 3D model.

Referring now to FIG. 7, an exemplary embodiment of method 700 that provides visualization within model 120 is described. At step 705, method 700 includes receiving, by at least a processor 104, a query image 112. This step may be implemented with reference to details described above in this disclosure and without limitation. In one or more embodiments, query image 112 may be a query medical image, such as a query ICE frame.

With continued reference to FIG. 7, at step 710, method 700 includes extracting, by at least a processor 104, neural network encodings 152 as a function of the received query image 112. This step may be implemented with reference to details described above in this disclosure and without limitation. In one or more embodiments, neural network encodings 152 may be extracted by generating plurality of shape parameters 156, wherein the generation of shape parameters 156 may involve training a pattern recognition model 160.

With continued reference to FIG. 7, at step 715, method 700 includes querying, by at least a processor 104, a synthetic image repository 168 for at least a matching synthetic image 172 based on extracted neural network encodings 152 of query image 112. This step may be implemented with reference to details described above in this disclosure and without limitation. In one or more embodiments, synthetic image repository 168 may contain plurality of synthetic images 172 and their corresponding neural network encodings 152. In one or more embodiments, plurality of synthetic images 172 may be generated by executing camera transformation program 176 configured to simulate at least a perspective of image capture device. In one or more embodiments, plurality of synthetic medical images may be generated using an image translation model 184.

With continued reference to FIG. 7, at step 720, method 700 includes displaying, by at least a processor 104, estimated ROI 188 of query image 112 within 3D model 120 by positioning query image 112 as a function of at least a matching synthetic image 172. This step may be implemented with reference to details described above in this disclosure and without limitation. In one or more embodiments, displaying estimated ROI within the 3D model 120 may include overlaying 2D cross section 192 containing the estimated ROI 188 within at least a portion of the 3D model 120.

Figure 8:
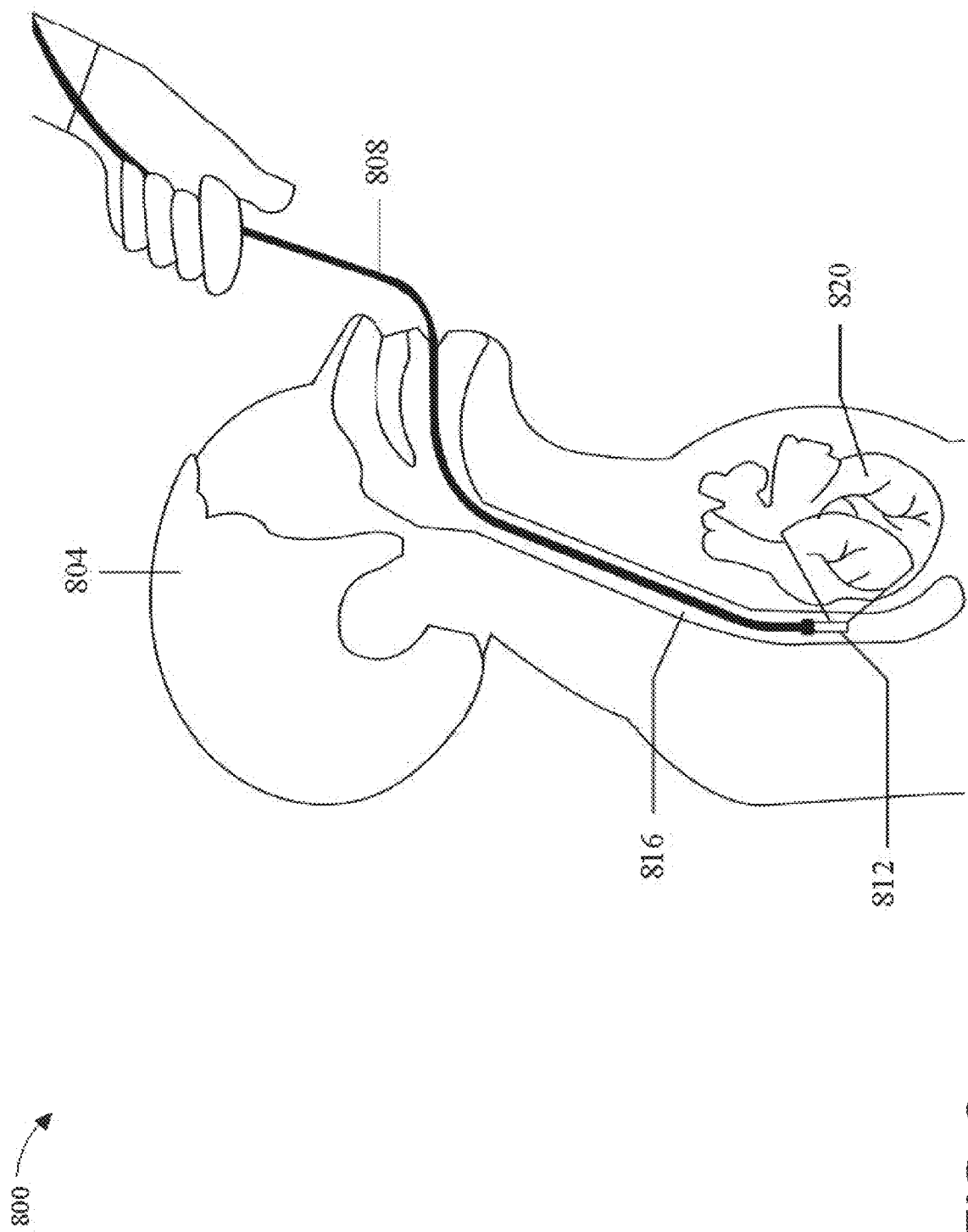
FIG. 8 is a schematic diagram of an exemplary transesophageal echocardiogram.

Now referring to FIG. 8, a schematic of an exemplary transesophageal echocardiogram (TEE) procedure 800 is shown. In some cases, TEE procedure 800 may be performed during another procedure for instance heart surgery. According to some embodiments, a patient 804 has an endoscope 808, with an ultrasonic transducer 812, inserted into his esophagus 816. As one's esophagus 816 is proximal one's heart 820, ultrasonic transducer 812 may generate echocardiograms.

Still referring to FIG. 8, in some embodiments, transesophageal echocardiography (TEE) may provide superior imaging quality than intracardiac echocardiography (ICE), as larger ultrasound transducers 812 may be placed within the esophagus 816 than within heart 820. In some cases, ultrasound transducers must be substantially miniaturized to fit within heart 820, as in ICE catheters. As esophagus 816 may be proximal to heart 820, TEE may provide a clear image of various heart structures without needing vascular access (as commonly required by ICE). Additionally, TEE may be performed without obstructing patient's 804 ribcage and intermediary tissues (as commonly required by transthoracic echocardiography [TTE]). In some cases, TEE images may also provide information associated with angle of acquisition. Angle of acquisition may be an angle of TEE probe with respect to esophagus 816 (e.g., esophageal axis).

Still referring to FIG. 8, in some embodiments, TEE echocardiogram data, including images showing heart structures and, in some cases, angle of acquisition, may be used as input to any machine learning process described in this application, for instance with reference to FIGS. 1-7, and 9. For instance TEE echocardiogram data may be used to reconstruct 3D heart models. In some cases, TEE echocardiogram data is input into a machine learning model that outputs a 3D heart model (e.g., 3D mesh model and/or statistical shape model).

Still referring to FIG. 8, in some embodiments, TEE may be a preferred imaging modality for structural heart interventions, such as without limitation left atrial appendage occlusion (LAOO) and aortic/mitral/other heart valve replacement procedures. In some cases, technology and improvements described in this disclosure permit creation and/or modification of a 3D heart mesh from TEE data to aid in planning implant size selection, as well as to guide implantation procedures. In some cases, virtual placement of a 3D model of a candidate implant (such as without limitation LAAO device and/or heart valve implants) can be simulated on a 3D heart model generated by any method described in this disclosure. This novel and improved functionality may validate appropriate size and placement of implants within heart 820, as well as other organs within body of patient 804. For example, in the context of electrophysiology procedures, TEE procedure 800 can be used to create heart anatomical models that can be used as reference for electroanatomic mapping, and guidance of ablation catheters for atrial fibrillation procedures (such as without limitation pulmonary vein isolation).

Still referring to FIG. 8, in some embodiments, applications described with reference to TEE procedure 800 above can be extended for use with TTE and point of care ultrasound (POCUS). In some cases, both TTE and POCUS may acquire ultrasound images of chest/surface of patient 804. In some cases, TTE and POCUS data may be used as an input (and/or training data) for any machine learning process described in this disclosure, for instance with reference to FIGS. 1-7 and 9. In some cases, use of TTE and/or POCUS data (in machine learning processes described in this disclosure) may require adjustment in ultrasound acquisition parameters and positions to acquire a sufficient number of frames for 3D reconstruction. In some cases, TTE and POCUS offer improved accessibility (with POCUS being portable/mobile as well) and non-invasive 3D heart modeling, often without anesthesia or sedation, compared to catheterized 3D heart modeling commonly performed today for electroanatomical mapping and ablation procedures.

Figure 9:
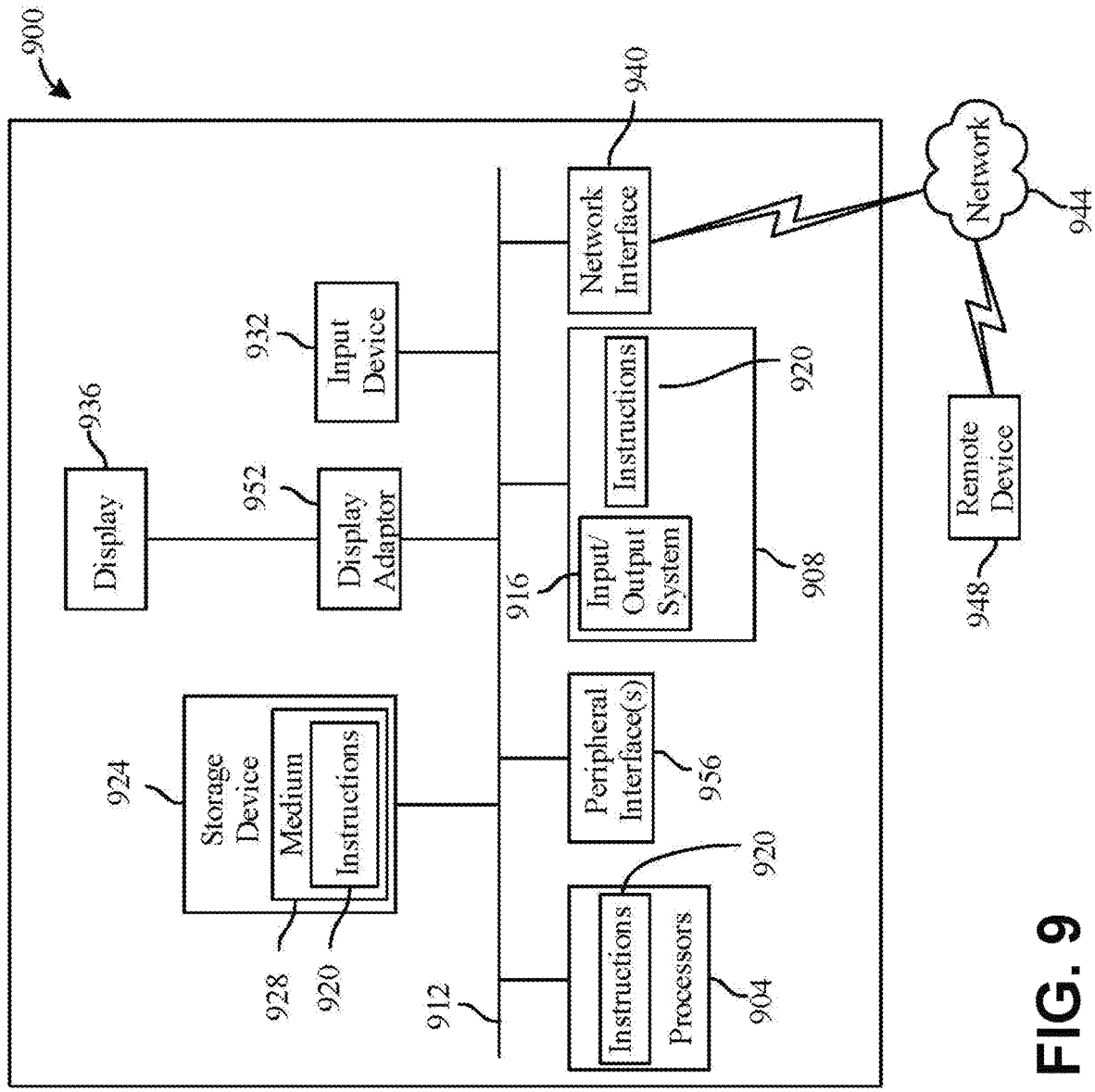
FIG. 9 is a block diagram of a computing system that can be used to implement any one or more of the methodologies disclosed herein and any one or more portions thereof.

Referring now to FIG. 9, it is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to one of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission. Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein. Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

With continued reference to FIG. 9, the figure shows a diagrammatic representation of one embodiment of a computing device in the exemplary form of a computing system 900 within which a set of instructions for causing the computing system 900 to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computing system 900 may include a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures. Processor 904 may include any suitable processor, such as without limitation a processor incorporating logical circuitry for performing arithmetic and logical operations, such as an arithmetic and logic unit, which may be regulated with a state machine and directed by operational inputs from memory and/or sensors; processor 904 may be organized according to Von Neumann and/or Harvard architecture as a nonlimiting example. Processor 904 may include, incorporate, and/or be incorporated in, without limitation, a microcontroller, microprocessor, digital signal processor, field programmable gate array, complex programmable logic device, graphical processing unit, general-purpose graphical processing unit, tensor processing unit, analog or mixed signal processor, trusted platform module, a floating-point unit, and/or system on a chip.

With continued reference to FIG. 9, memory 908 may include various components (e.g., machine-readable media) including, but not limited to, a random-access memory component, a read only component, and any combinations thereof. In one example, a basic input/output system 916, including basic routines that help to transfer information between elements within computing system 900, such as during start-up, may be stored in memory 908. Memory 908 (e.g., stored on one or more machine-readable media) may also include instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

With continued reference to FIG. 9, computing system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, small computer system interface, advanced technology attachment, serial advanced technology attachment, universal serial bus, IEEE 1394 (FIREWIRE), and any combinations thereof. In one example, storage device 924 (or one or more components thereof) may be removably interfaced with computing system 900 (e.g., via an external port connector (not shown)). Particularly, storage device 924 and an associated machine-readable medium 928 may provide nonvolatile and/or volatile storage of machine-readable instructions, data structures, program modules, and/or other data for computing system 900. In one example, software 920 may reside, completely or partially, within machine-readable medium 928. In another example, software 920 may reside, completely or partially, within processor 904.

With continued reference to FIG. 9, computing system 900 may also include an input device 932. In one example, a user of computing system 900 may enter commands and/or other information into computing system 900 via input device 932. Examples of input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

With continued reference to FIG. 9, user may also input commands and/or other information to computing system 900 via storage device 924 (e.g., a removable disk drive, a flash drive, etc.) and/or network interface device 940. A network interface device, such as network interface device 940, may be utilized for connecting computing system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide-area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computing system 900 via network interface device 940.

With continued reference to FIG. 9, computing system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computing system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus that provides visualization within a three-dimensional (3D) model, the apparatus comprising:
   at least a processor; and
   a memory communicatively connected to the at least a processor, wherein the memory contains instructions configuring the at least a processor to:
   receive a query image;
   extract neural network encodings as a function of the received query image;
   query a synthetic image repository for at least a matching synthetic image based on the extracted neural network encodings, wherein;
   the synthetic image repository comprises a plurality of synthetic images;
   each synthetic image within the plurality of synthetic images corresponds to a slice extracted at a specific position and orientation in a 3D model; and
   querying the synthetic image repository comprises comparing the extracted neural network encodings of the query image with the extracted neural network encodings of each synthetic image within the plurality of synthetic images; and
   display the query image at an estimated position and orientation within the 3D model.

2. The apparatus of claim 1, wherein:
   the query image comprises a query ultrasonic image; and
   the synthetic image repository comprises a plurality of synthetic ultrasonic images.

3. The apparatus of claim 1, wherein the at least a processor is further configured to generate a plurality of synthetic images using an image translation model, wherein generating the plurality of synthetic images using the image translation model comprises:
   receiving image translation training data, either paired or unpaired, comprising a plurality of training images correlated to a plurality of training 2D projections; and
   training the image translation model using the image translation training data; and synthesizing at least a synthetic image as a function of the at least a 2D projection using the trained image translation model.

4. The apparatus of claim 1, wherein the 3D model is constructed based on a patient profile, wherein the patient profile comprises a plurality of structure images and associated metadata.

5. The apparatus of claim 1, wherein the 3D model is constructed using a plurality of transthoracic echocardiogram (TTE) frames.

6. The apparatus of claim 1, wherein the 3D model is constructed using a plurality of point of care ultrasound (POCUS) frames.

7. The apparatus of claim 1, wherein the 3D model is constructed using a plurality of intracardiac echocardiography (ICE) frames.

8. The apparatus of claim 1, wherein the processor is further configured to generate the 3D model using a statistical shape model (SSM) and a prior point cloud distribution estimated from one or more of a patient profile, a plurality of TTE frames, a plurality of POCUS frames, or a plurality of ICE frames.

9. The apparatus of claim 8, wherein the processor is further configured to instantiate the SSM, wherein instantiating the SSM comprises:
receiving, at the at least a processor, paired data comprising live ultrasonic images correlated to position and orientation information of the live ultrasonic images, either directly acquired from an ultrasonic imaging device or by estimation using another machine learning model;
extracting at least a point cloud from the paired data; and
training the SSM using one or more structure datasets.

10. The apparatus of claim 1, wherein displaying an estimated region of interest within the 3D model comprises positioning the query image as a function of the at least a matching synthetic image.

11. A method that provides visualization within a three-dimensional (3D) model, the method comprising:
receiving a query image;
extracting neural network encodings as a function of the received query image;
querying a synthetic image repository for at least a matching synthetic image based on the extracted neural network encodings, wherein;
the synthetic image repository comprises a plurality of synthetic images;
each synthetic image within the plurality of synthetic images corresponds to a slice extracted at a specific position and orientation in a 3D model; and
querying the synthetic image repository comprises comparing the extracted neural network encodings of the query image with the extracted neural network encodings of each synthetic image within the plurality of synthetic images; and
displaying the query image at an estimated position and orientation within the 3D model.

12. The method of claim 11, wherein:
the query image comprises a query ultrasonic image; and
the synthetic image repository comprises a plurality of synthetic ultrasonic images.

13. The method of claim 11, wherein the method further comprises generating a plurality of synthetic images using an image translation model wherein generating the plurality of synthetic images using the image translation model comprises:
receiving image translation training data, either paired or unpaired, comprising a plurality of training images correlated to a plurality of training 2D projections; and
training the image translation model using the image translation training data; and
synthesizing at least a synthetic image as a function of the at least a 2D projection using the trained image translation model.

14. The method of claim 11, wherein the 3D model is constructed based on a patient profile, wherein the patient profile comprises a plurality of structure images and associated metadata.

15. The method of claim 11, wherein the 3D model is constructed using a plurality of transthoracic echocardiogram (TTE) frames.

16. The method of claim 11, wherein the 3D model is constructed using a plurality of point of care ultrasound (POCUS) frames.

17. The method of claim 11, wherein the 3D model is constructed using a plurality of intracardiac echocardiography (ICE) frames.

18. The method of claim 11, wherein the processor is further configured to generate the 3D model using a statistical shape model (SSM) and a prior point cloud distribution estimated from one or more of a patient profile, a plurality of TTE frames, a plurality of POCUS frames, or a plurality of ICE frames.

19. The method of claim 18, wherein the method further comprises instantiating the SSM, wherein instantiating the SSM comprises:
receiving, at the at least a processor, paired data comprising live ultrasonic images correlated to position and orientation information of the live ultrasonic images, either directly acquired from an ultrasonic imaging device or by estimation using another machine learning model;
extracting at least a point cloud from the paired data;; and
training the SSM using one or more structure datasets.

20. The method of claim 11, wherein displaying an estimated region of interest within the 3D model comprises positioning the query image as a function of the at least a matching synthetic image.

* * * * *